(12) United States Patent
Graves et al.

(10) Patent No.: US 12,460,635 B2
(45) Date of Patent: Nov. 4, 2025

(54) ELECTRIC PUMP SYSTEM AND METHOD WITH HOLLOW SHAFT AND TEMPERATURE SENSOR

(71) Applicant: Tesla, Inc., Austin, TX (US)

(72) Inventors: Scott Michael Graves, Felton, CA (US); Eric Bellemare, Mountain View, CA (US); Yufei Zhu, Sunnyvale, CA (US); Benjamin Dellal, San Francisco, CA (US); Diego Alberto Silva Rodriguez, Cupertino, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/385,307

(22) Filed: Oct. 30, 2023

(65) Prior Publication Data

US 2024/0060490 A1 Feb. 22, 2024

Related U.S. Application Data

(63) Continuation of application No. 15/944,841, filed on Apr. 4, 2018, now Pat. No. 11,821,420.
(Continued)

(51) Int. Cl.
*F04C 11/00* (2006.01)
*F04C 2/10* (2006.01)
(Continued)

(52) U.S. Cl.
CPC .......... *F04C 11/008* (2013.01); *F04C 2/102* (2013.01); *F04C 14/26* (2013.01);
(Continued)

(58) Field of Classification Search
CPC .... F04C 15/008; F04C 15/06; F04C 15/0096; F04C 11/008; F04C 2/102; F04C 2/10;
(Continued)

(56) References Cited

U.S. PATENT DOCUMENTS 2,809,590 A 10/1957 Brown
3,220,349 A 11/1965 White
(Continued)

FOREIGN PATENT DOCUMENTS

CN 103161719 6/2013
CN 103161719 A * 6/2013 .............. F04C 14/06
(Continued)

OTHER PUBLICATIONS

English Machine Translation of JP-2014061765-A (Year: 2014).*
(Continued)

*Primary Examiner* — Nathan C Zollinger
(74) *Attorney, Agent, or Firm* — Knobbe, Martens, Olson & Bear, LLP

(57) ABSTRACT

An electric pump system and method of operating the same involves pumping a fluid through a fluid passageway defined in a mechanical pump from a pump inlet to a hollow shaft of a motor, through the hollow shaft to an internal motor cavity defined by a housing of the motor, and through another fluid passageway defined in the motor housing and mechanical pump that leads to a pump outlet. The system and method further involve pumping the fluid through another fluid passageway defined in the mechanical pump from yet another pump inlet to the pump outlet. The temperature of fluid exiting the hollow shaft can be assessed and used by an electronic control unit (ECU) of the electric pump system to control the same. The electric pump system can be part of a cooling and lubrication system for an electric vehicle transmission, gearbox, differential or transfer case, for example.

17 Claims, 22 Drawing Sheets

Related U.S. Application Data

(60) Provisional application No. 62/527,699, filed on Jun. 30, 2017.

(51) Int. Cl.
  *F04C 14/26* (2006.01)
  *F04C 15/00* (2006.01)
  *F04C 15/06* (2006.01)

(52) U.S. Cl.
  CPC .......... *F04C 15/0096* (2013.01); *F04C 15/06* (2013.01); *F04C 2240/603* (2013.01)

(58) Field of Classification Search
  CPC .... F04C 14/28; F04C 14/26; F04C 2240/603; F04C 2240/808; F04C 2240/40; F04C 2/103; F04C 2/104; F04C 29/02; F04C 29/023; F04C 29/042; H02K 7/14; H02K 11/33; H02K 9/19; H02K 1/32; H02K 9/193
  See application file for complete search history.

(56) References Cited

U.S. PATENT DOCUMENTS

| | | | |
|---|---|---|---|
| 4,322,030 A | 3/1982 | Jacobson et al. | |
| 5,206,819 A | 4/1993 | Illing | |
| 5,529,114 A | 6/1996 | Hall et al. | |
| 5,997,261 A | 12/1999 | Kershaw et al. | |
| 6,012,909 A * | 1/2000 | Sloteman | H02K 5/1282 |
| | | | 417/370 |
| 6,065,946 A * | 5/2000 | Lathrop | F24D 19/1012 |
| | | | 417/42 |
| 6,435,836 B1 | 8/2002 | Kobayashi et al. | |
| 6,729,307 B2 * | 5/2004 | Dong | F04C 14/26 |
| | | | 123/497 |
| 6,847,140 B2 | 1/2005 | Kimberlin et al. | |
| 7,576,459 B2 * | 8/2009 | Down | H02K 9/19 |
| | | | 310/58 |
| 11,821,420 B2 * | 11/2023 | Graves | F04B 53/08 |
| 11,959,481 B2 * | 4/2024 | Rosinski | F04C 15/0096 |
| 2004/0028539 A1 * | 2/2004 | Williams | F04D 13/064 |
| | | | 417/366 |
| 2005/0122682 A1 | 6/2005 | Streit et al. | |
| 2007/0018516 A1 | 1/2007 | Pal et al. | |
| 2008/0075608 A1 | 3/2008 | Suzuki et al. | |
| 2013/0183175 A1 | 7/2013 | Irie et al. | |
| 2014/0363311 A1 * | 12/2014 | Schreiber | F04D 29/053 |
| | | | 417/420 |
| 2015/0349594 A1 | 12/2015 | Zhang et al. | |
| 2016/0138587 A1 | 5/2016 | Huang et al. | |
| 2016/0230767 A1 | 8/2016 | Thompson et al. | |
| 2017/0009778 A1 * | 1/2017 | Ye | H02K 5/18 |
| 2017/0067469 A1 * | 3/2017 | Malvasi | F01M 1/02 |
| 2019/0003477 A1 | 1/2019 | Graves et al. | |

FOREIGN PATENT DOCUMENTS

| | | | |
|---|---|---|---|
| CN | 206206192 | | 5/2017 |
| CN | 206206192 U | * | 5/2017 |
| DE | 102015108373 | | 12/2015 |
| EP | 1 126 176 | | 8/2001 |
| EP | 1 178 212 | | 2/2002 |
| EP | 1 414 134 | | 4/2004 |
| EP | 1 600 635 | | 11/2005 |
| EP | 2 812 579 | | 12/2014 |
| EP | 2 733 326 | | 5/2015 |
| EP | 3 073 119 | | 9/2020 |
| JP | 2006-262611 | | 9/2006 |
| JP | 2009-162146 | | 7/2009 |
| JP | 2010-188932 | | 9/2010 |
| JP | 2011-254580 | | 12/2011 |
| JP | 2014061765 A | * | 4/2014 |
| JP | 2015-105601 | | 6/2015 |
| JP | 2015-533200 | | 11/2015 |
| WO | WO 03/083311 | | 10/2003 |
| WO | WO 14/158329 | | 10/2014 |

OTHER PUBLICATIONS

International Searching Authority; International Search Report and Written Opinion; International application No. PCT/IB2018/054596; Oct. 9, 2018; 13 pgs.

* cited by examiner

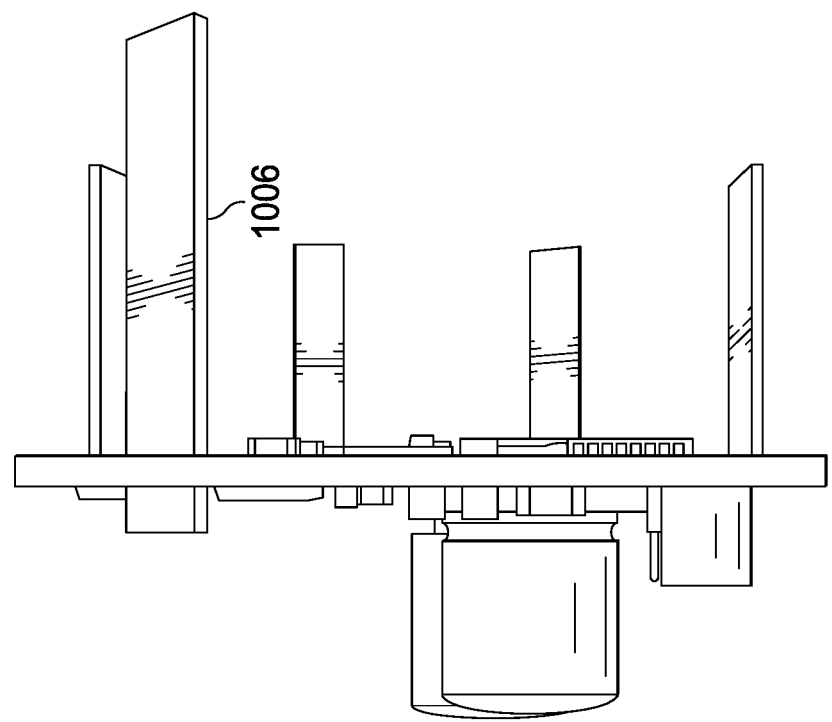
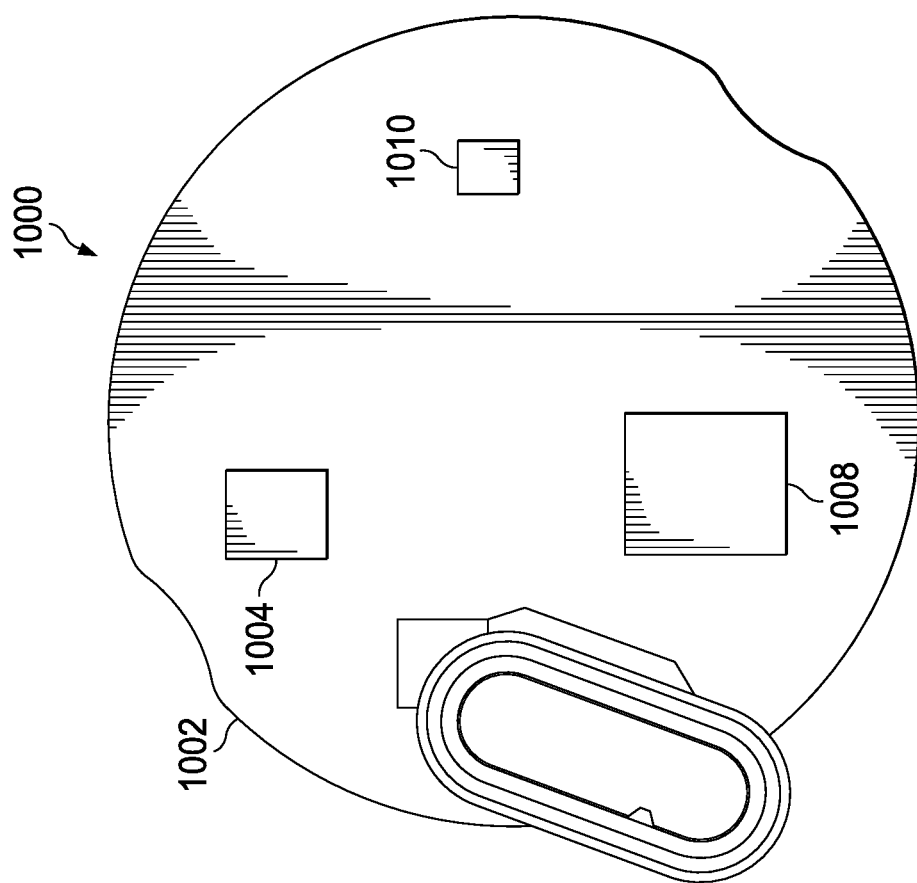
FIG. 10B
FIG. 10A

ELECTRIC PUMP SYSTEM AND METHOD WITH HOLLOW SHAFT AND TEMPERATURE SENSOR

CROSS-REFERENCES TO RELATED APPLICATIONS

The present U.S. Utility Patent Application is a continuation of U.S. patent application Ser. No. 15/944,841, entitled "ELECTRIC PUMP SYSTEM AND METHOD," filed Apr. 4, 2018, which claims priority to U.S. Provisional Application No. 62/527,699, entitled "ELECTRIC PUMP SYSTEM AND METHOD," filed Jun. 30, 2017, which are hereby incorporated herein by reference in their entireties and made part of the present U.S. Utility Patent Application for all purposes.

The present application is related to U.S. Utility patent application Ser. No. 15/637,313, entitled "SYSTEM AND METHOD FOR MONITORING STRESS CYCLES," filed Jun. 29, 2017, which is incorporated by reference in its entirety.

BACKGROUND

Technical Field

The present invention relates to electric pump systems, and more particularly to the transfer of heat, and assessment of fluid temperature in electric pump systems, such as those used in the drive system of a vehicle.

Description of Related Art

An electric pump system in the drive system of an electric vehicle, for example, may be used to provide oil to the bearings, rotor and stator of a traction motor, amongst other places, in order to cool and lubricate the traction motor. Such electric pump systems typically include a mechanical pump, an electric motor as well as electronics for controlling the electric pump system.

Challenges associated with designing such electric pump systems include designing a pump system with desired flow properties. Traditional oil pumps do not monitor oil condition and thus require oil to be changed on a regular basis because the condition of the oil, pump, and motor cannot be independently verified. A further byproduct is that traditional oil pump is not designed to (and cannot) accurately determine temperature, in part, because any temperature sensor is located either outside of the traditional pump system or in a region representative of the oil flowing through the pump. Further, traditional oil pumps are often large and unwieldy due to attachment mechanisms of different parts and requires a larger physical space for the pump. There is a need, therefore, for an improved oil pump, particular an electric pump system, designed to work in conjunction with an electric motor.

SUMMARY

The present disclosure presents methods and structures that help overcome the difficulties of operating a cooling and lubrication system, in particular, managing the transfer of heat and assessment of fluid temperature in electric pump systems.

According to one aspect of the present disclosure, there is provided an apparatus that includes an electronic control unit, a mechanical pump, and a motor having a first side and a second side, the motor including: a stator, a rotor including a hollow shaft, and a housing around the stator and rotor, wherein the electronic control unit is connected to the first side of the motor, wherein the mechanical pump is connected to the second side of the motor, wherein the hollow shaft defines a shaft inlet and a shaft outlet, wherein the mechanical pump defines a first fluid passageway from a first pump inlet to the shaft inlet, wherein the housing defines an internal motor cavity, wherein the shaft outlet is in fluid communication with the internal motor cavity, wherein the mechanical pump defines a second fluid passageway from a second pump inlet to a pump outlet, and wherein the motor housing and mechanical pump define a third fluid passageway from the internal motor cavity to the pump outlet via a third pump inlet.

In some embodiments the apparatus according to the above-described aspect of the present disclosure or any other aspects thereof, a number of optional operations and features may be employed. One optional feature is the electronic control unit further including a thermistor to measure a temperature of a fluid exiting the shaft outlet. Another optional feature is wherein the housing defines a bypass inlet in fluid communication with the internal motor cavity. Another optional feature is at least a portion of the second fluid passageway and the third fluid passageway is common. Another optional feature is the mechanical pump is a gerotor. Another optional feature is the electronic control unit includes a microcontroller controlling the mechanical pump. Another optional feature is the electronic control unit includes cooling ribs.

According to one aspect of the present disclosure, there is provided a method of pumping a fluid in an electric pump system including pumping the fluid through a first fluid passageway from a first pump inlet to a shaft inlet, through a hollow shaft of a motor from the shaft inlet to a shaft outlet, and into an internal motor cavity of the electric pump system that is in fluid communication with the shaft outlet, through a second fluid passageway from a second pump inlet of a mechanical pump to a pump outlet of the mechanical pump, and through a third fluid passageway defined in a motor housing of the electric pump system and in the mechanical pump from the internal motor cavity to the pump outlet via a third pump inlet.

In some embodiments the method according to the above-described aspect of the present disclosure or any other aspects thereof, a number of optional operations and features may be employed. One optional feature is measuring a temperature of the fluid exiting the hollow shaft. Another optional feature is providing the fluid to the internal motor cavity through a bypass inlet defined in the motor housing of the motor. Another optional feature is including pumping the fluid from a bypass inlet to the internal motor cavity. Another optional feature is the mechanical pump includes a gerotor. Another optional feature is controlling the mechanical pump with an electronic control unit including a microcontroller.

According to one aspect of the present disclosure, there is provided a system including an apparatus including a mechanical pump, an electronic control unit, and a motor having a first side and a second side, the motor including a stator, a rotor including a hollow shaft and a housing around the stator and rotor, wherein the electronic control unit is connected to the first side of the motor, wherein the mechanical pump is connected to the second side of the motor, wherein the hollow shaft defines a shaft inlet and a shaft outlet, wherein the mechanical pump defines a first fluid passageway from a first pump inlet to the shaft inlet, wherein the housing defines an internal motor cavity, wherein the shaft outlet is in fluid communication with the internal motor cavity, wherein the mechanical pump defines a second fluid passageway from a second pump inlet to a pump outlet, and wherein the motor housing and mechanical pump define a third fluid passageway from the internal motor cavity to the pump outlet, via a third pump inlet, a heat exchanger in fluid communication with the pump outlet, and an oil reservoir in fluid communication with the first pump inlet and the second pump inlet.

In some embodiments the method according to the above-described aspect of the present disclosure or any other aspects thereof, a number of optional operations and features may be employed. One optional feature is the electronic control unit further includes a thermistor to measure a temperature of a fluid exiting the shaft outlet. Another optional feature is the housing defines a bypass inlet in fluid communication with the internal motor cavity. Another optional feature is at least a portion of the second fluid passageway and the third fluid passageway is common. Another optional feature is the mechanical pump is a gerotor. Another optional feature is the electronic control unit includes a microcontroller controlling the mechanical pump. Another optional feature is the electronic control unit includes cooling ribs.

BRIEF DESCRIPTION OF THE SEVERAL VIEWS OF THE DRAWINGS

FIGS. 10A 10B, and 10C illustrate an ECU side end view, a side view, and motor side end view, respectively, of ECU electronics according to a disclosed embodiment.

DETAILED DESCRIPTION OF THE DISCLOSURE

Figure 1:
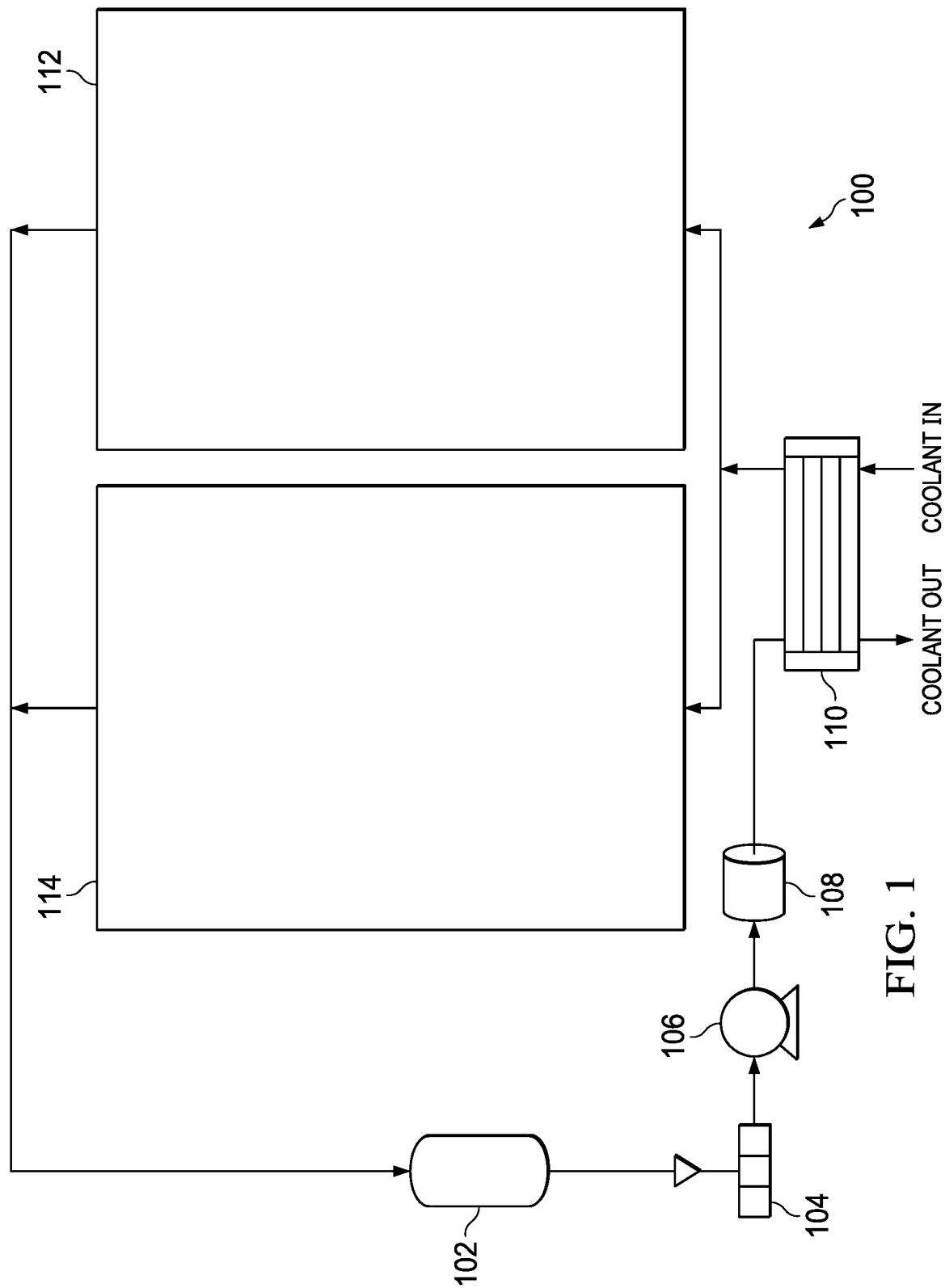
FIG. 1 illustrates the basic components of a cooling and lubrication system in an electric vehicle.

FIG. 1 illustrates a schematic diagram of a cooling and lubrication system 100 according to a disclosed embodiment used to circulate a fluid, for example oil, though various components of an electric drive unit of an electric vehicle. Subsequent descriptions of the other figures may relate back to the components of FIG. 1, and common numbering may be used to refer to components identified in those figures. Further, although the embodiments described herein are in the context of an oil-based system, other fluids may be used. For example, any fluid that provides adequate lubrication, heat transfer, and flow properties, for a particular application or pump size, may be used.

Starting from oil reservoir 102, which may include a sump or dry-sump system (oil reservoir external to the drive unit), oil flows through meshed filter 104 to electric pump system 106. Oil pumped out of electric pump system 106 passes through oil filter 108 and heat exchanger 110 and splits between a first branch that leads to motor 112 and another that leads to gear box 114. Oil from both branches drains back to oil reservoir 102.

Various operational issues with the cooling and lubrication system 100 are described herein in conjunction with various embodiments. One operational issue relates to heat exchange within the electric pump system 106. Another operational issue relates to assessing and controlling the temperature of oil in the cooling and lubrication system 100. The oil temperature may be controlled by heat transfer in heat exchanger 110, i.e., exchange of heat between the vehicle coolant and the oil. Firmware or software typically controls the Engine Control Unit which is not shown in FIG. 1, and the electric pump system 106.

Figure 2A:
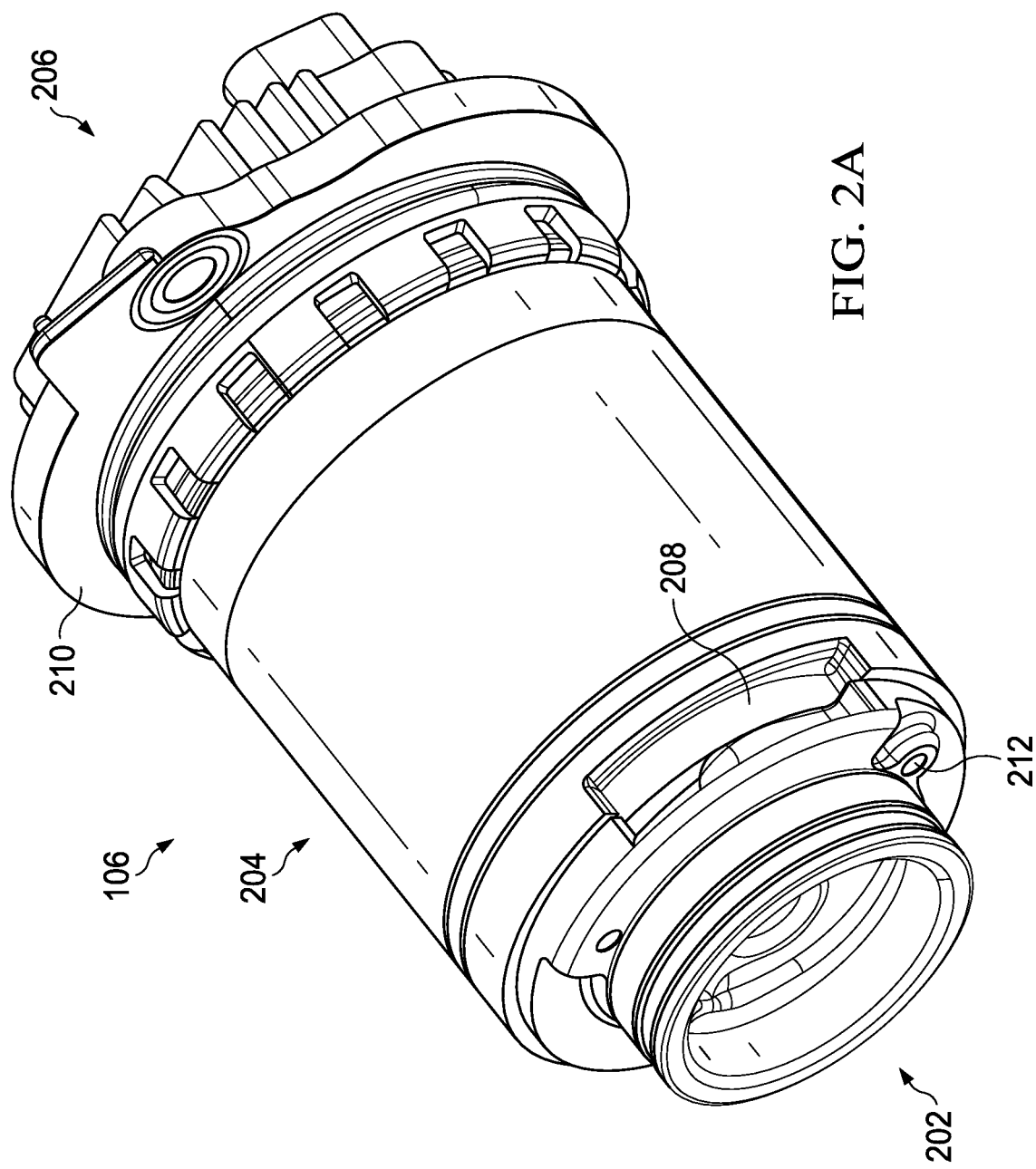
FIGS. 2A and 2B illustrate front and rear perspective views respectively of an electric pump system according to a disclosed embodiment.
Figure 2B:
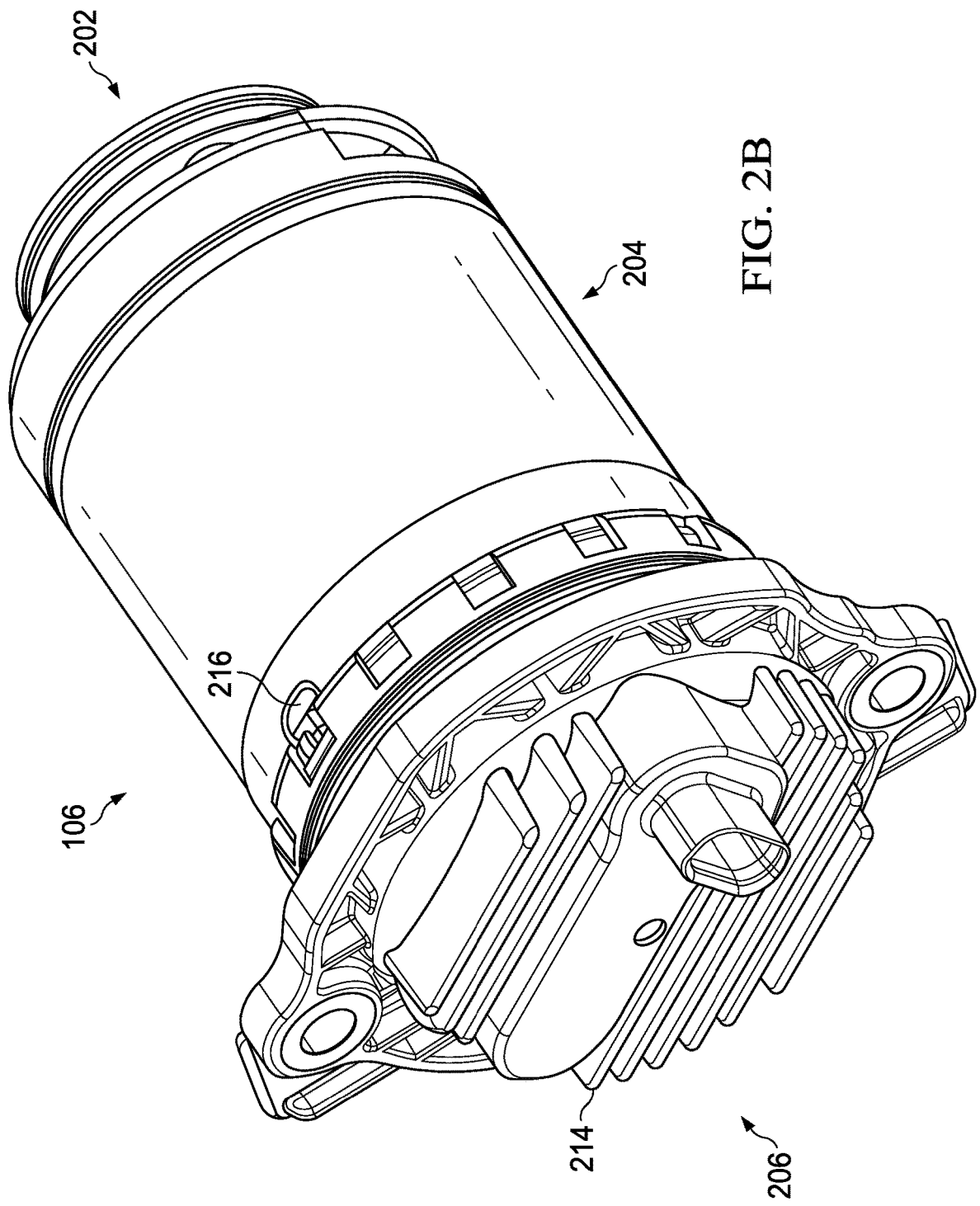

FIGS. 2A and 2B illustrate a front and rear perspective view, respectively, of an electric pump system 106 according to a disclosed embodiment. FIG. 2A, in particular, shows mechanical pump 202, electric motor 204 and Electronic Control Unit (ECU) 206. Also shown is cast-in pump outlet 208, ECU housing 210 having an integrated design, and pump bolt 212 for connecting mechanical pump 202 of electric pump system 106 to electric motor 204 (in particular the motor housing). These elements are explained in greater detail below. FIG. 2B also shows mechanical pump 202, electric motor 204 and ECU 206. ECU 206 is shown having cooling ribs 214, only one of which is so labelled in FIG. 2B. Also shown is bypass inlet 216 which will also be explained in greater detail below.

Figure 3A:
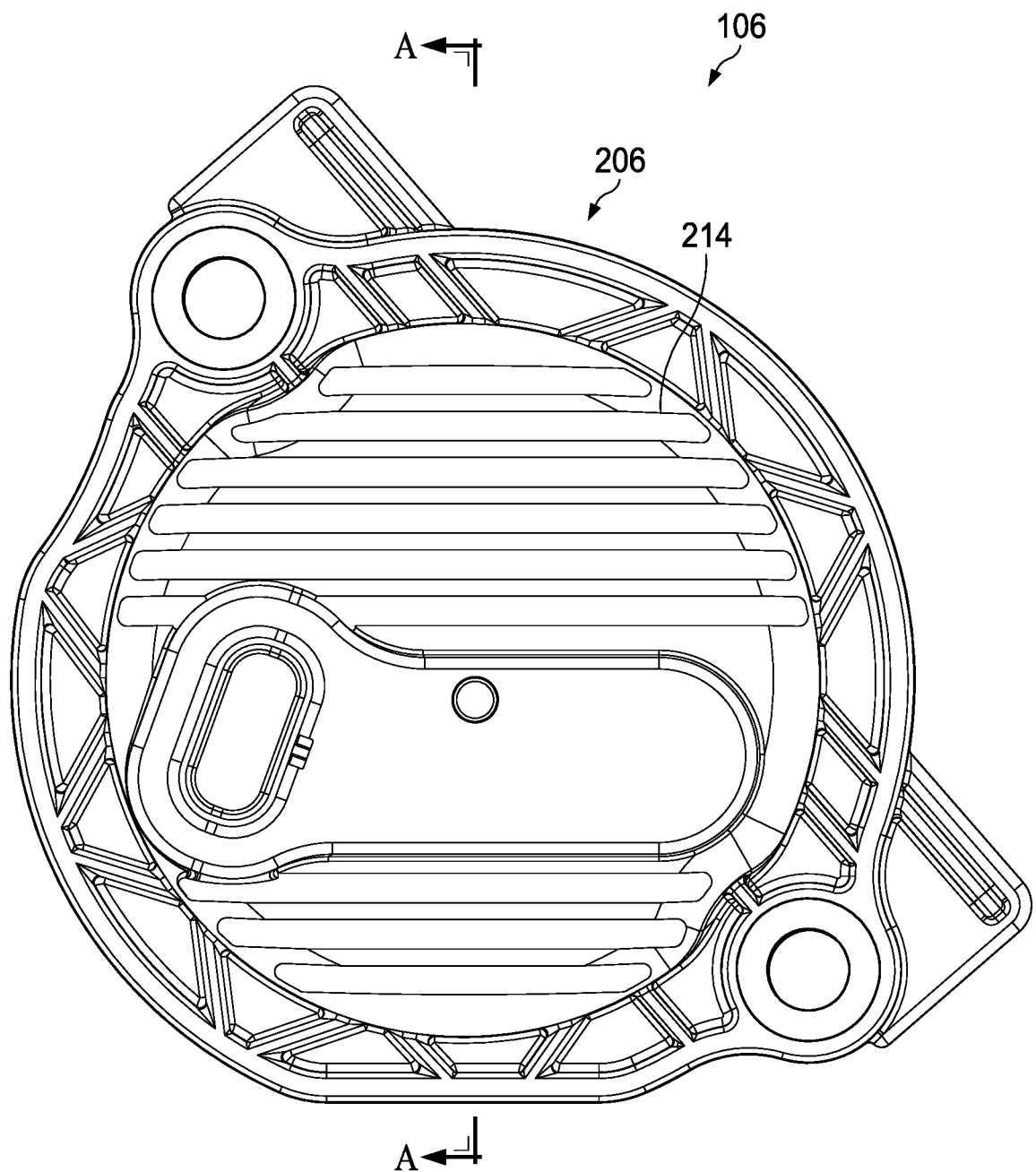
FIGS. 3A and 3B illustrate a rear view and a side sectional view along cutting line A-A of FIG. 3A, respectively, of an electric pump system according to a disclosed embodiment.
Figure 3B:
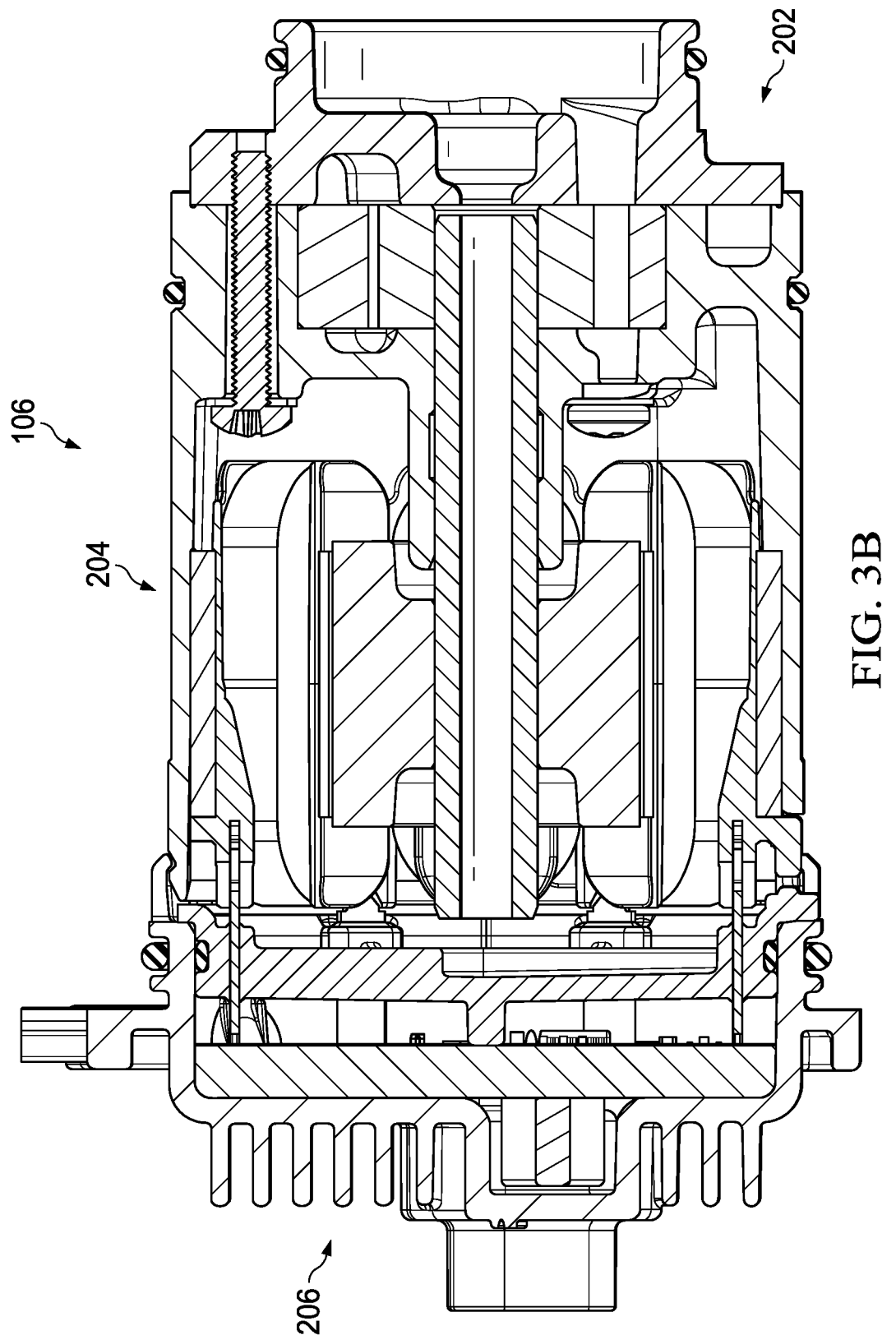

FIGS. 3A and 3B illustrate a rear view and side sectional view along cutting line A-A of FIG. 3A, respectively, of electric pump system 106 according to a disclosed embodiment. The rear view of FIG. 3A shows ECU 206 with cooling ribs 214. The side sectional view of FIG. 3B shows mechanical pump 202, electric motor 204, and ECU 206.

Figure 4A:
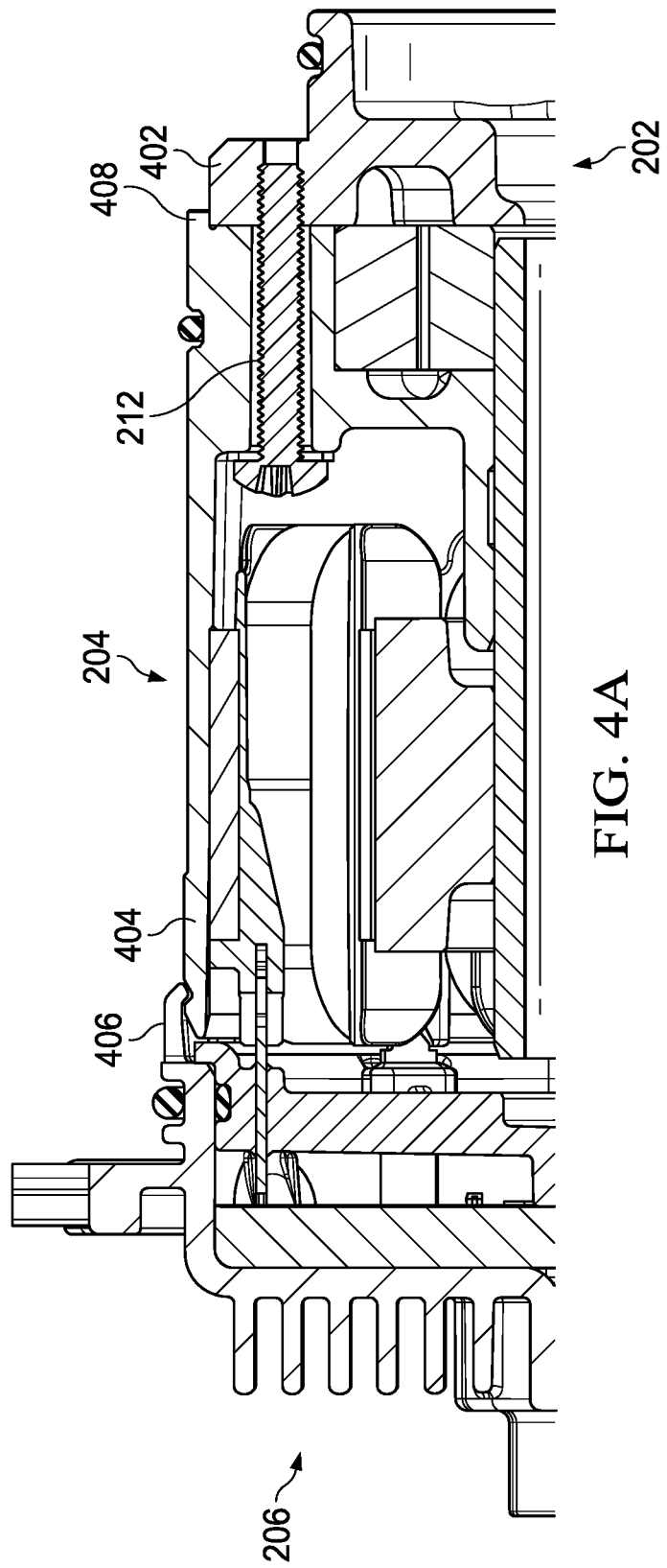
FIGS. 4A and 4B illustrate a side sectional view and a perspective view respectively of an electric pump system according to a disclosed embodiment, in particular showing the attachment of the components of the electric pump system.
Figure 4B:
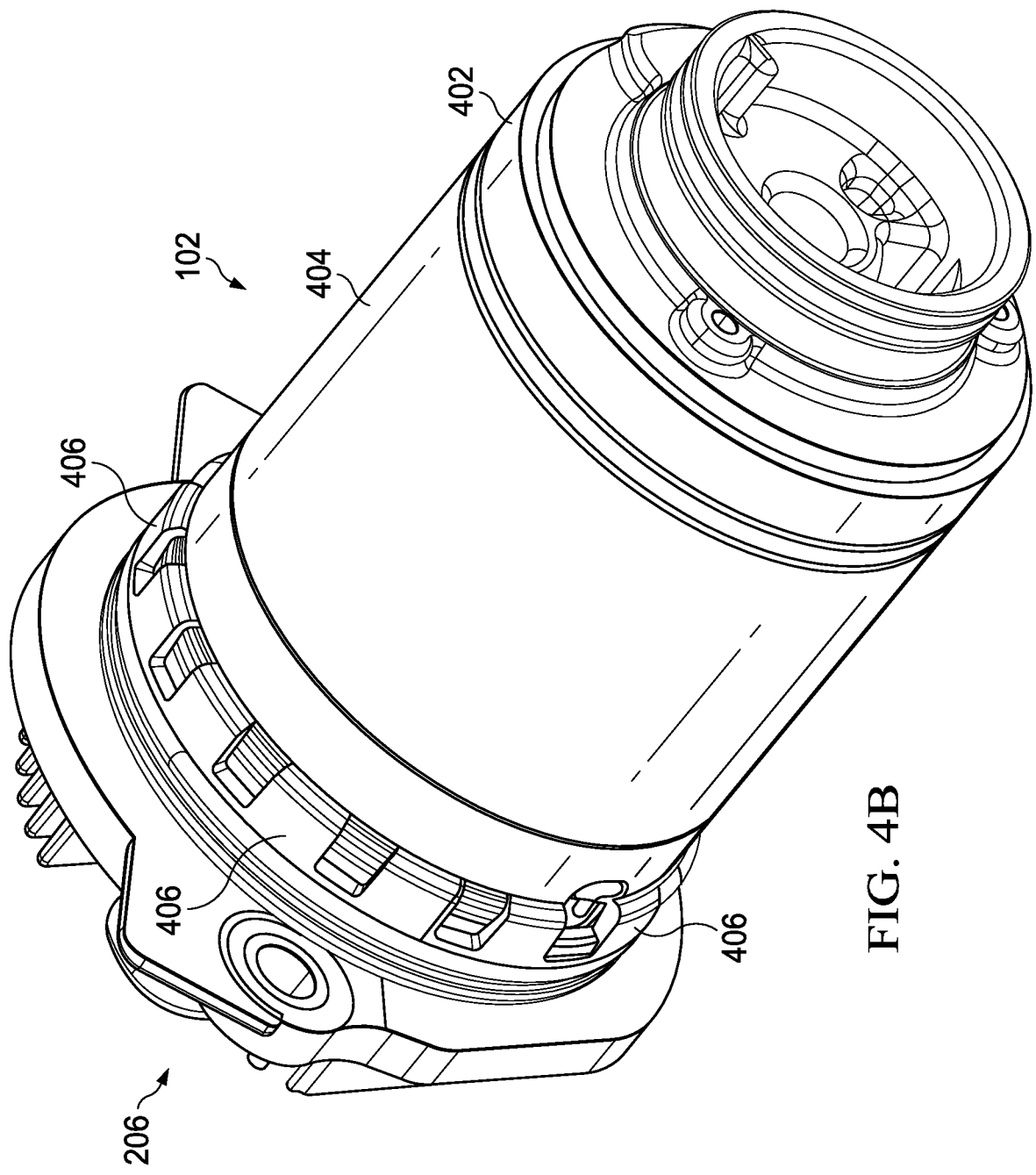

FIGS. 4A and 4B illustrate a side sectional view and a perspective end view, respectively, of an electric pump system according to a disclosed embodiment, in particular showing the attachment of the components of the electric pump system. As shown in FIG. 4A, ECU 206 is attached to motor housing 404 using clip 406. While only one such clip is shown in FIG. 4A, multiple clips could be used as shown in FIG. 4B. Motor housing 404 is further attached to pump housing 402 using alignment feature 408 of motor housing 404 as well as pump bolt 212. While only one pump bolt 212 is shown, the electric pump system may include a plurality of such pump bolts. As shown therein, pump bolt 212 is disposed within motor housing 404 such that the head thereof is within the internal motor cavity. Such an arrangement reduces the size of the oil pump packaging, which in turn can result in an optimized electric pump system having higher performance (i.e. better efficiency and greater flow, for example). Motor housing 404 and pump housing 402 may be cast metal. As noted above, FIG. 4B shows multiple clips 406 connecting ECU 206 to motor housing 404. Specifically, clips 406 are shown placed around motor housing 404 such that they can be checked visually from outside of electric pump system 106. When there are sufficient clips connecting ECU 206 to motor housing 404, no bolt is required.

Figure 5:
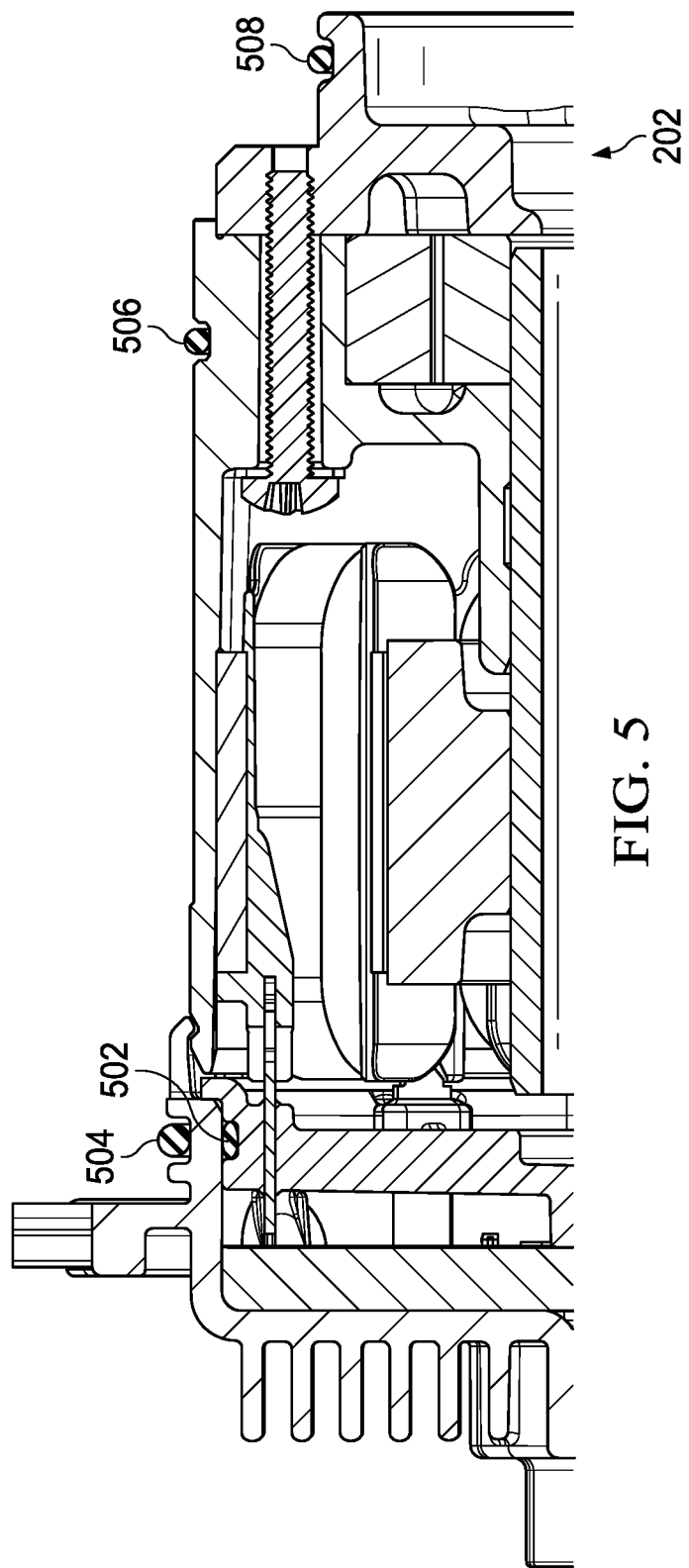
FIG. 5 illustrates a partial side sectional view of an electric pump system according to a disclosed embodiment, in particular showing the sealing of the electric pump system.

FIG. 5 illustrates a side sectional view of an electric pump system according to a disclosed embodiment, in particular showing the sealing of the electric pump system. As shown in FIG. 5, electric pump system 106 is sealed using radial O-rings 502, 504, 506 and 508. O-ring 502 is an internal O-ring to seal ECU 206. O-ring 504 provides sealing to ambient. O-rings 506 and 508 are on either side of the pressurized outlet of the electric pump system, which outlet will be described in more detail below.

Figure 6B:
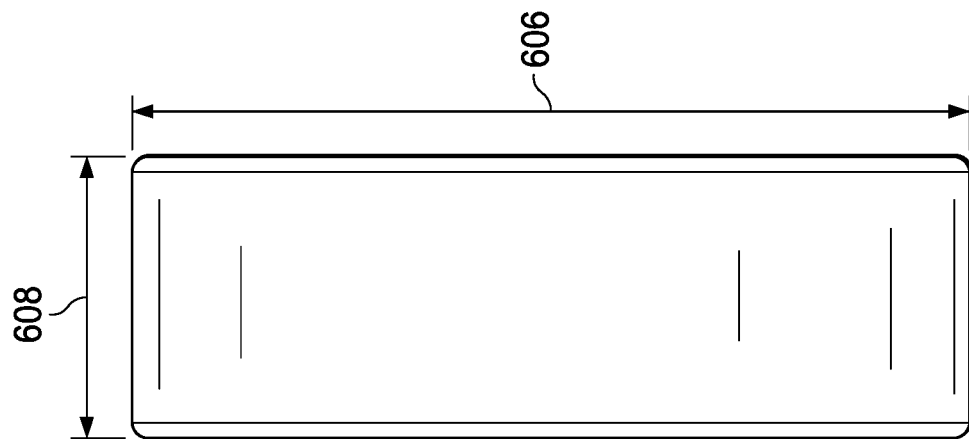
FIGS. 6A and 6B illustrates a front view and a side view respectively of a gerotor used in an electric pump system according to a disclosed embodiment.
Figure 6A:
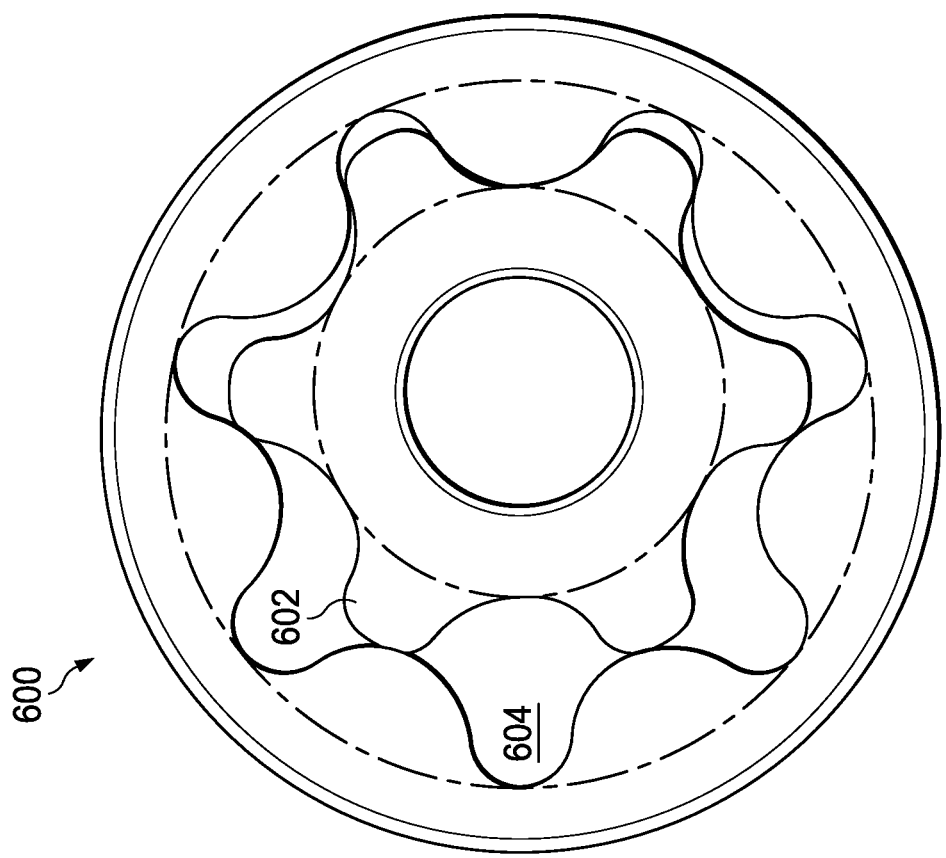

FIGS. 6A and 6B illustrates a front view and a side view respectively of gerotor 600 which can be part of mechanical pump 202. As shown in FIG. 6A, gerotor 600 has six teeth, one of which is shown by reference number 602, and seven cavities, one of which is shown by reference number 604. According to a disclosed embodiment (as shown in FIG. 6B), the outside diameter 606 of gerotor 600 is greater than the width 608 While a specific gerotor is provided as one example, mechanical pump 202 is not so limited and could include any mechanical positive displacement pump arrangement or a gerotor with differing teeth counts, displacements, etc.

Figure 7A:
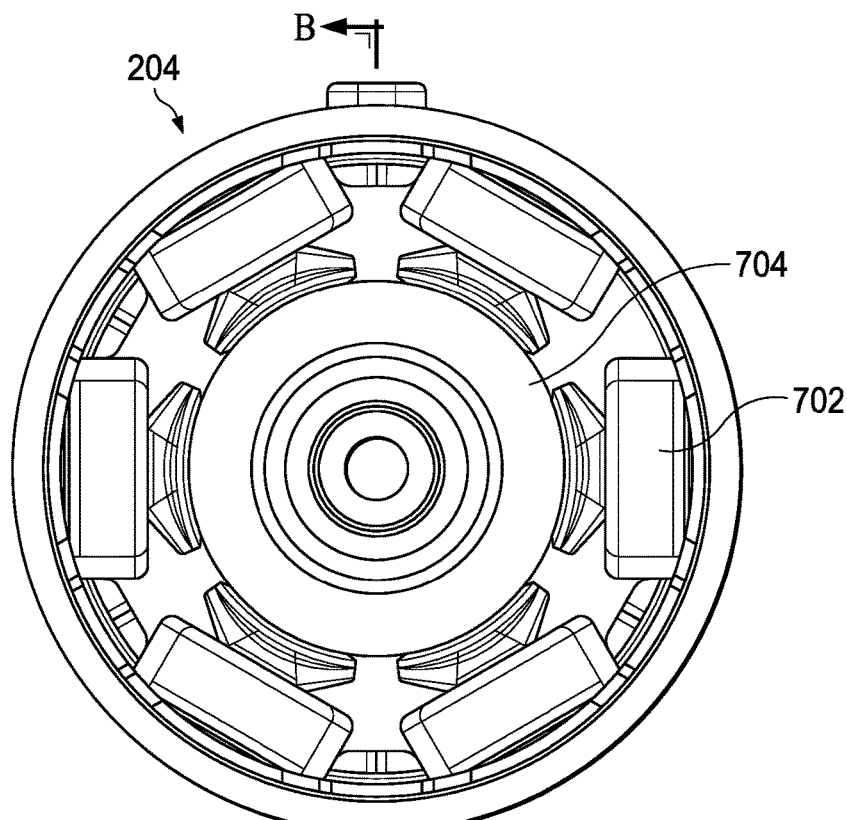
FIGS. 7A and 7B illustrate an end view and a side sectional view taken along cutting line B-B of FIG. 7A, respectively, of an electric motor used in an electric pump system according to a disclosed embodiment.
Figure 7B:
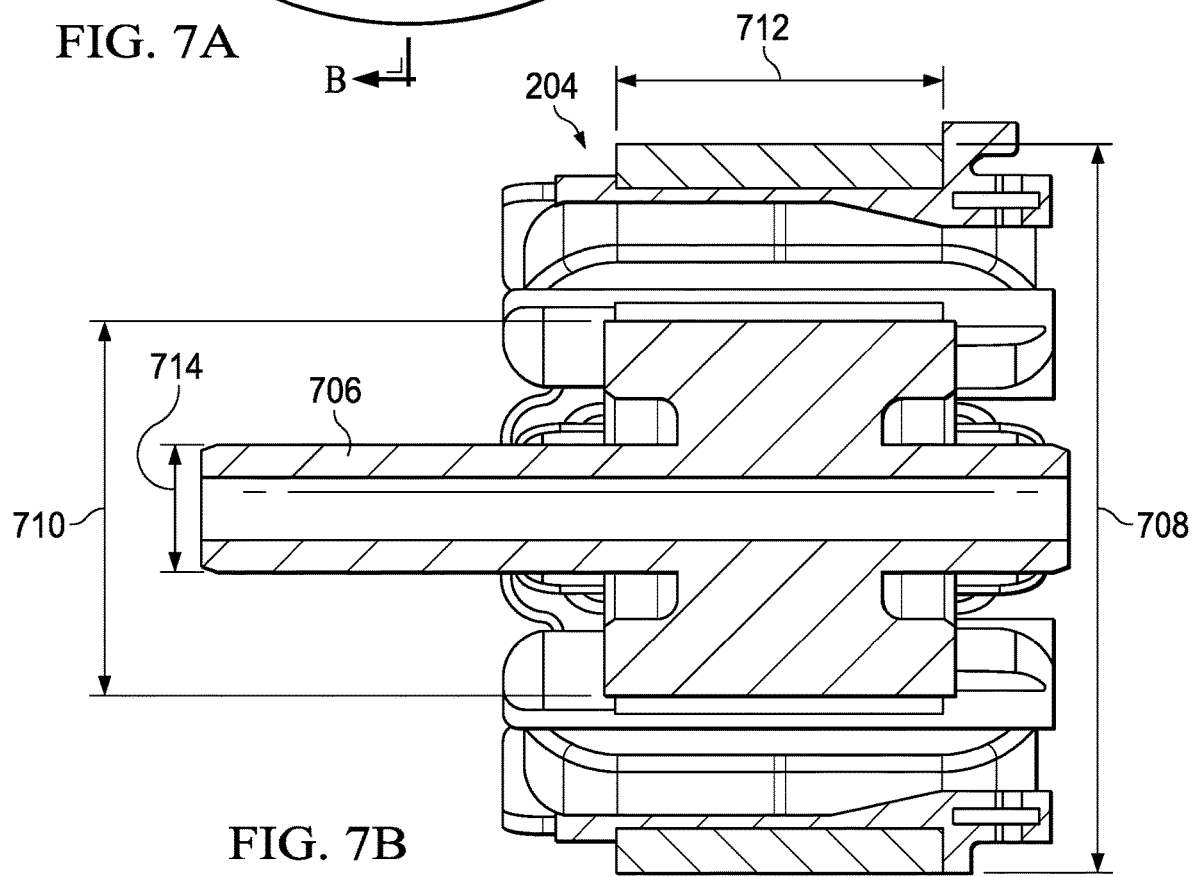

FIGS. 7A and 7B illustrate an end view and a side sectional view taken along cutting line B-B of FIG. 7B, respectively, of electric motor 204 used in an electric pump system according to a disclosed embodiment. As shown in FIGS. 7A and 7B, electric motor 204 includes stator windings, one of which is labeled with reference number 702, and rotor 704. Rotor 704 includes hollow shaft 706 that allows oil to flow through the shaft. In other embodiments, rotor 704 includes a solid shaft and oil may flow to the motor cavity through other paths.

Figure 8:
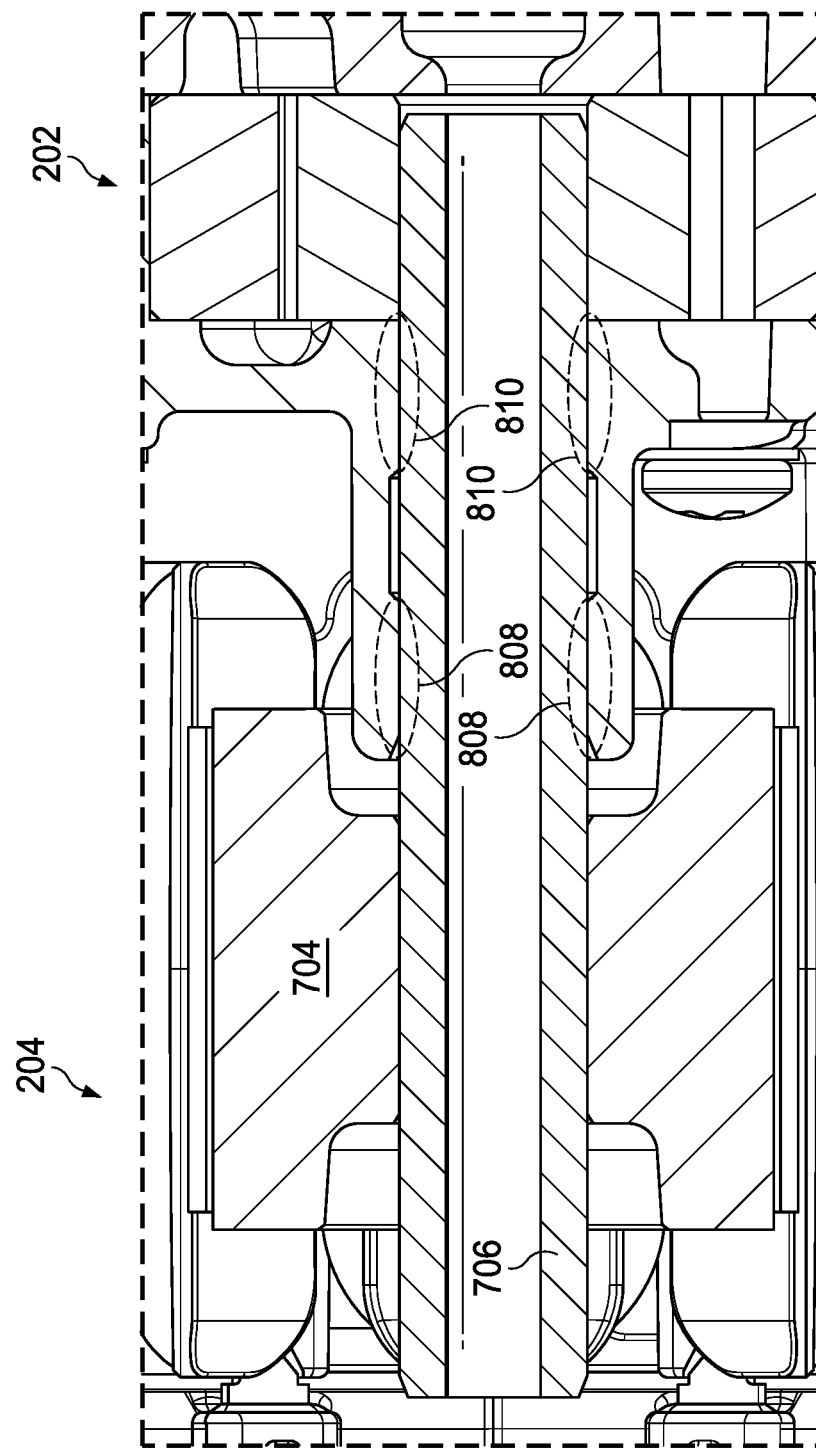
FIG. 8 illustrates a partial side sectional view of an electric pump system, in particular showing the shaft used in the electric pump system according to a disclosed embodiment.

FIG. 8 illustrates a partial side sectional view of an electric pump system, in particular showing the shaft used therein according to a disclosed embodiment. As shown therein, hollow shaft 706 extends through rotor 704 of electric motor 204 and into mechanical pump 202. According to one embodiment, rotor 704 is press fit to hollow shaft 706. Hollow shaft 706 is supported by two plain bearings 808 and 810, which in this example include two side to side, adjacent surfaces with a very high surface quality and low tolerances so that the gap therebetween is controlled to a tight and optimized condition for a chosen lubricant and operation points.

Figure 9A:
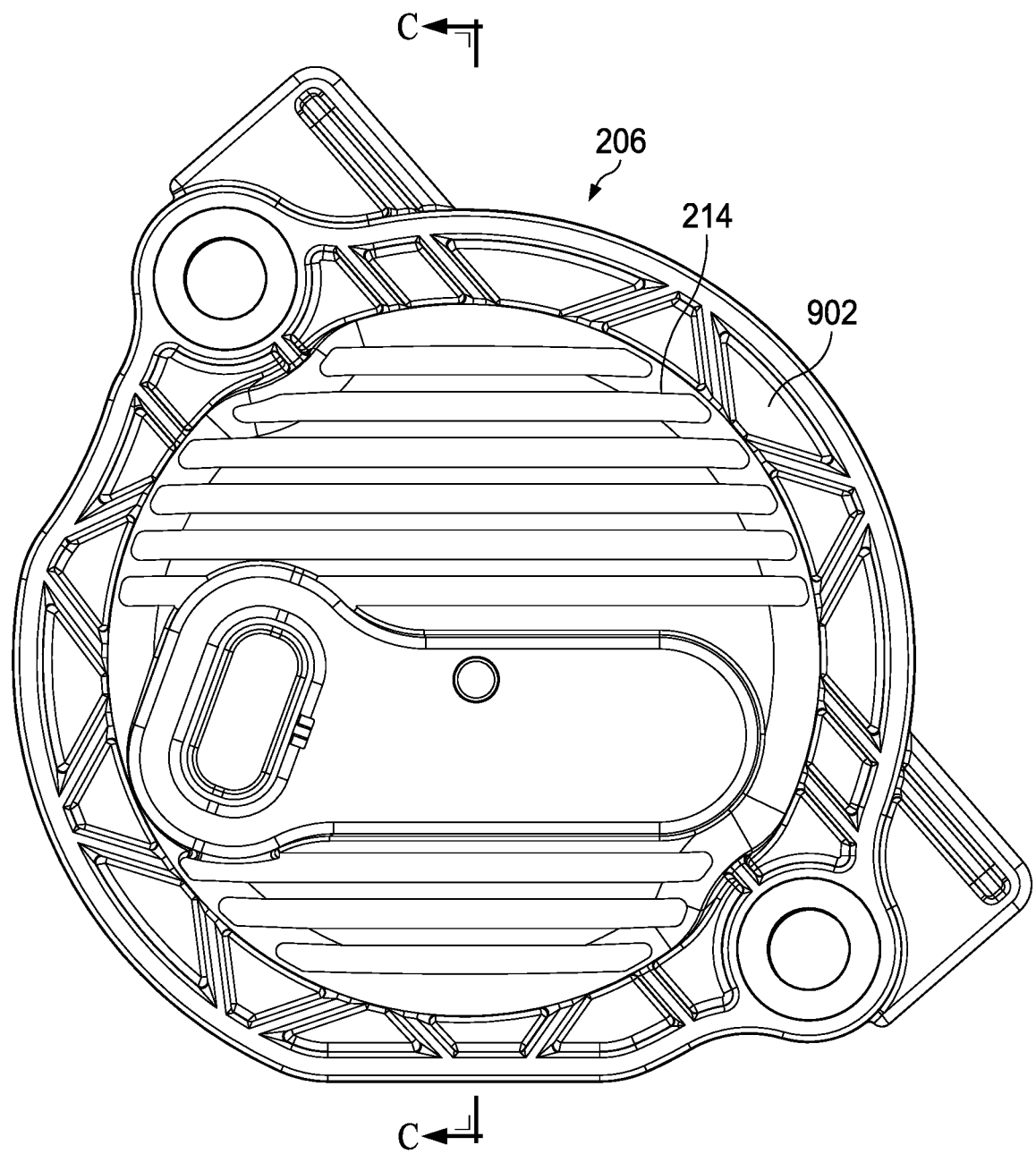
FIGS. 9A, 9B and 9C illustrate a rear view, a side view and a side sectional view along cutting line C-C of FIG. 9A, respectively, of an electronic control unit (ECU) used in an electric pump system according to a disclosed embodiment.
Figure 9B:
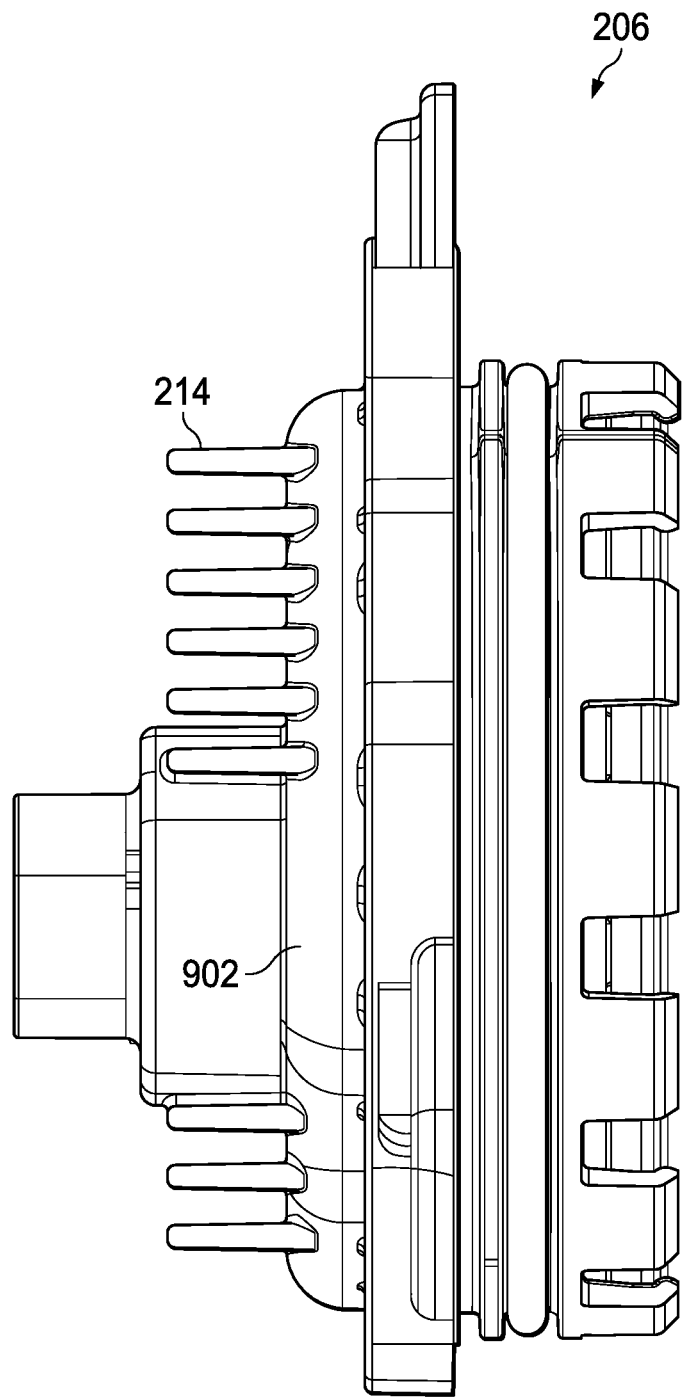
Figure 9C:
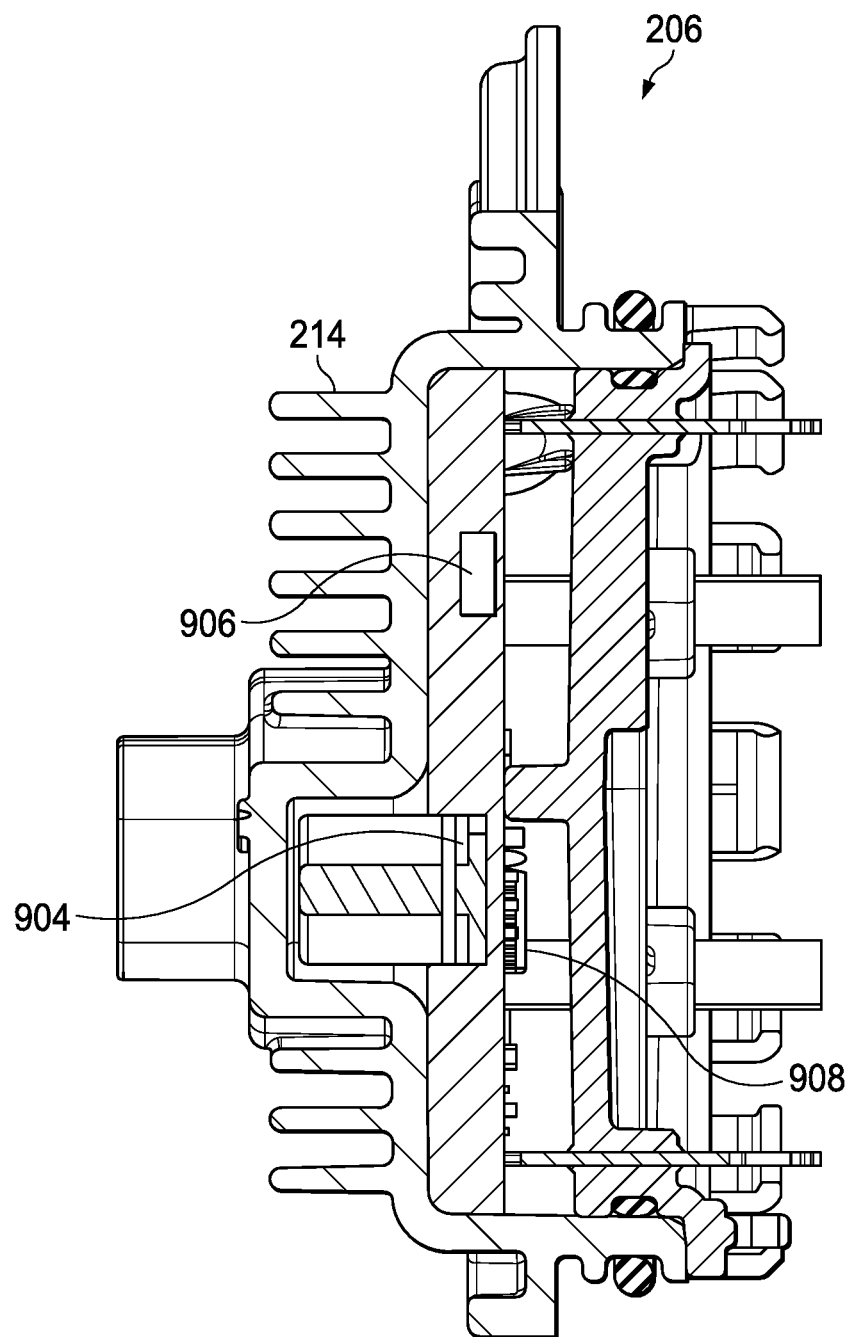

FIGS. 9A, 9B and 9C illustrate a rear view, side view and side sectional view along cutting line C-C of FIG. 9A, respectively, of ECU 206 used in an electric pump system according to a disclosed embodiment. Cooling ribs 214 are attached to (or part of) ECU cover 902. Cooling ribs 214 provide a thermal interface to dissipate heat from the electronics through the ECU cover 902 to ambient. Also shown are capacitors, one of which is labeled 904, one or more transistors (such as MOSFETs) labeled 906, and microchip 908. The ECU may capture information, such as temperature, pump speed, pump current composition, oil pressure, and other information. The information captured by the ECU may then be fed into a proprietary algorithm that monitors oil pump and overall drive unit health. The algorithm may provide an indication of service, such as when oil must be replaced or when the drive train needs to be serviced.

Figure 10C:
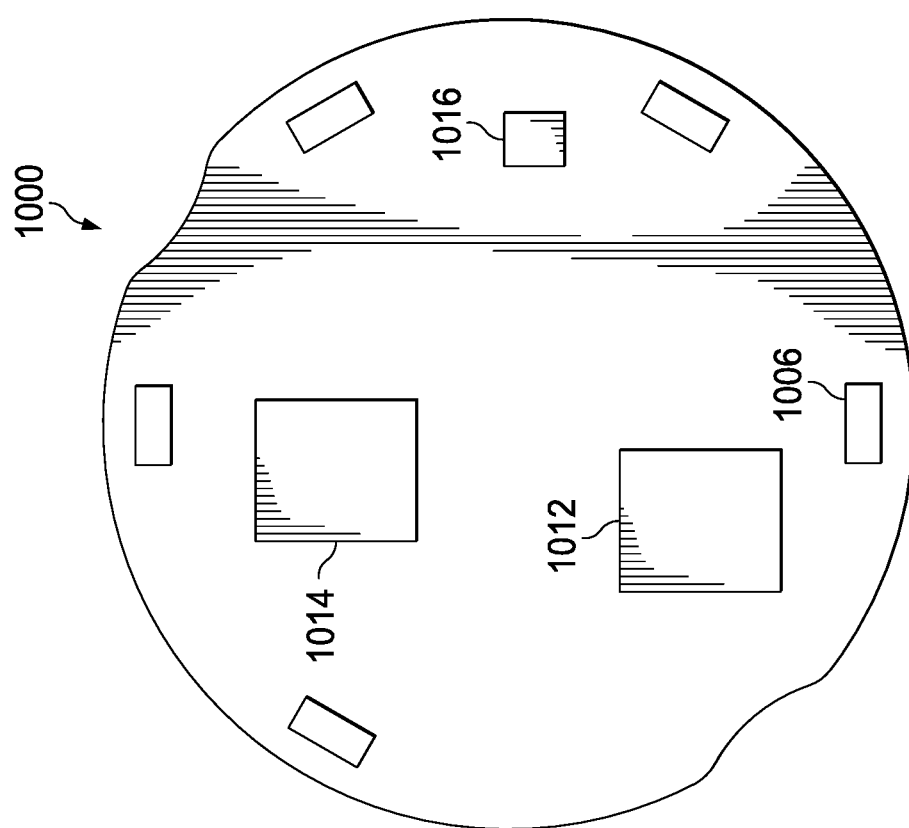

FIGS. 10A 10B, and 10C illustrate an ECU side end view, a side view, and motor side end view, respectively, of ECU electronics according to a disclosed embodiment. As shown in FIG. 10A, from the ECU side, ECU electronics 1000 include a printed circuit board (PCB) 1002 and electrical components, one of which is labeled 1004. The electrical components may include a processor or microcontroller for running firmware and/or software, a communication transceiver, a current sensing component, a motor control, a gate driver and capacitors, one of which is labeled 1008. Another electronic component can include a thermistor 1010 for measuring the temperature of the PCB 1002 and electrical components, which temperature is known as the "printed circuit board assembly" (PCBA) temperature. The side view of FIG. 10B illustrates mounting legs 1006 that support PCB 1002. As shown in FIG. 10C, from the motor side, ECU electronics 1000 can include processor or microcontroller 1012 for controlling the pump system, motor control integrated circuit 1014 and oil temperature thermistor 1016. ECU electronics 1000 may further include bootloader software for purposes of loading software updates.

Figure 11:
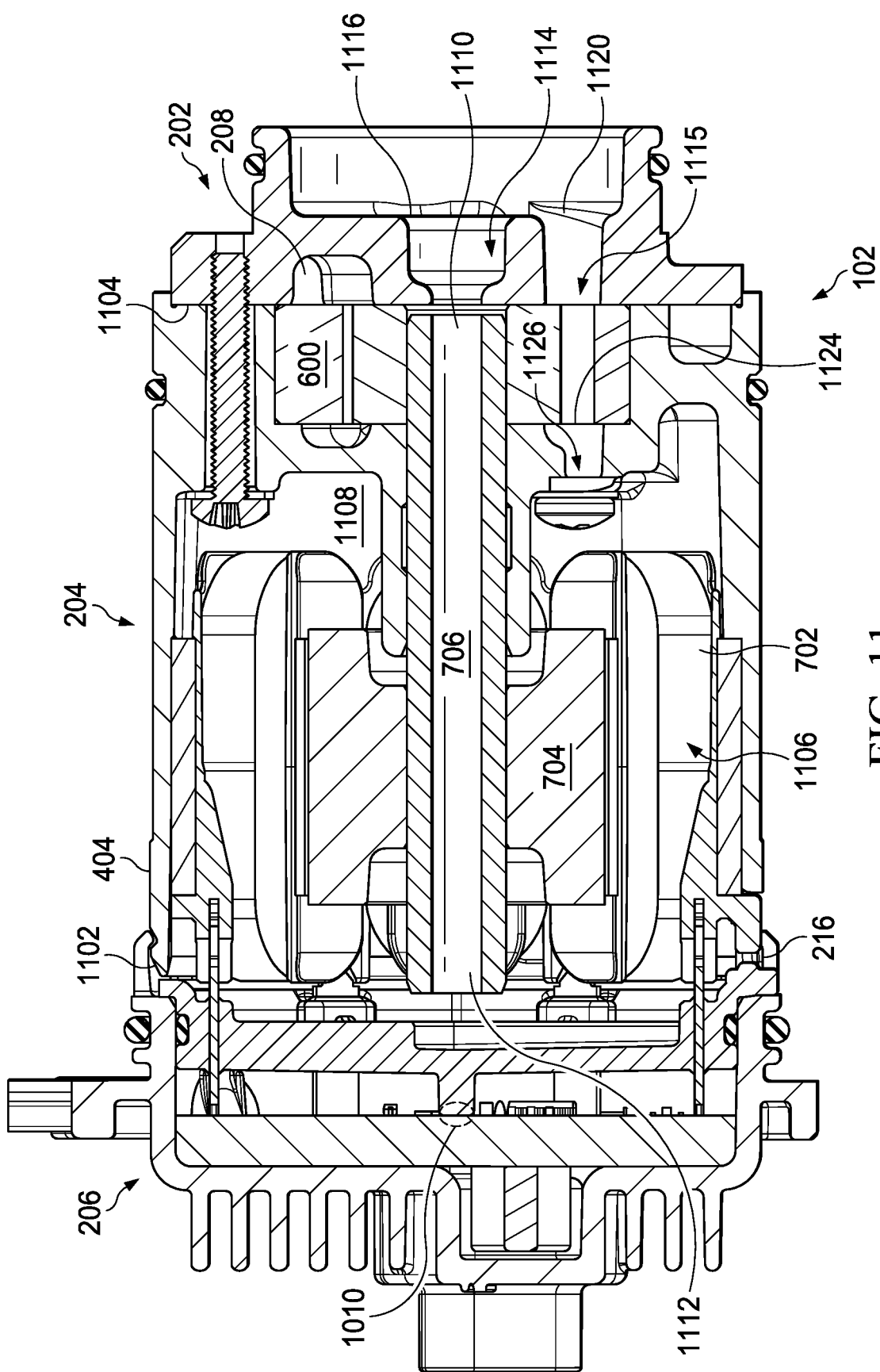
FIG. 11 illustrates a side sectional view of an electric pump system according to a disclosed embodiment.

FIG. 11 illustrates a side sectional view of an electric pump system according to a disclosed embodiment. As shown therein, electric motor 204 has an ECU side 1102 (which may also be referred to as the first side) and a pump side 1104 (which may also be referred to as the second side). Connected to the ECU side 1102 is ECU 206, and connected to pump side 1104 is mechanical pump 202. Also shown is motor housing 404 positioned around rotor 704 and stator 1106, thereby defining an internal motor cavity 1108 through which fluid may flow within the motor housing 404 and past rotor 704 and stator 1106. Rotor 704 includes hollow shaft 706 and stator 1106 includes end-windings 702. Hollow shaft 706 defines shaft inlet 1110 and shaft outlet 1112.

Also shown in FIG. 11, mechanical pump 202 defines a fluid passageway 1114 therethrough, from secondary pump inlet 1116 to shaft inlet 1110. Via hollow shaft 706, fluid entering shaft inlet 1110 proceeds to shaft outlet 1112 which is in fluid communication with internal motor cavity 1108. Internal motor cavity 1108, in turn, is in fluid communication with pump inlet 1124. Together, mechanical pump 202 and motor housing 404 define fluid passageway 1126 from internal motor cavity 1108 to pump outlet 208 via pump inlet 1124.

Also shown in FIG. 11, oil temperature thermistor 1016 is located adjacent shaft outlet 1112 such that the temperature of fluid existing the shaft outlet 1112 can be determined, either directly or through a traceable relationship (i.e. when the temperature measured at the thermistor=x, then the temperature of the fluid at the outlet y=function f(x)), prior to being substantially heated by electric pump system 106. Notwithstanding the specific placement of oil temperature thermistor 1016 shown in FIG. 10C, oil temperature thermistor 1016 may be placed anywhere on ECU 206. In the specific example of FIG. 10C, oil temperature thermistor 1016 is placed near mounting legs 1006 which mounting legs 1006 can be used to transfer heat to ECU 206. As such oil temperature thermistor 1016 can be used to read the temperature of the high electrical conductivity and thermal conductivity material of mounting legs 1006 and ECU traces (not shown) near mounting legs 1006.

Also shown in FIG. 11 is bypass inlet 216 in fluid communication with internal motor cavity 1108. Bypass inlet 216 allows for oil to flow into internal motor cavity 1108 in the event of a blockage within the pump that prevents oil from flowing through shaft inlet 1110. That is to say, if a blockage occurs, oil may still flow through bypass inlet 216 and to pump outlet 208 and thereby provide lubrication to the electric motor and other components. Though not specifically shown in FIG. 11, a small circumferential gap may also optionally exist between ECU 206 and motor housing 404 to allow oil to flow into internal motor cavity 1108. According to a disclosed embodiment, hollow shaft 706 could be replaced with a solid shaft in which case either or both of bypass inlet 216 and the circumferential gap could be used to provide oil to internal motor cavity 1108. Alternatively, electric pump system 106 need not use bypass inlet 216 and/or the circumferential gap, and instead rely on hollow shaft 706 to deliver oil to internal motor cavity 1108.

Also show in FIG. 11 is fluid passageway 1115 defined by mechanical pump 202 and extending from main pump inlet 1120, through gerotor 600, to pump outlet 208. As such a portion of the fluid passageway 1115 and 1126 may common (i.e. through gerotor 600 and to pump outlet 208).

Fluid passageway 1115 may also be referred to as the first fluid passageway. Main pump inlet 1120 may also be referred to as the first pump inlet. Fluid passageway 1126 may also be referred to as the second fluid passageway. Pump inlet 1124 may also be referred to as the second pump inlet. Fluid passageway 1114 may also be referred to as the third fluid passageway. Secondary pump inlet 1116 may also be referred to as the third pump inlet.

Figure 12:
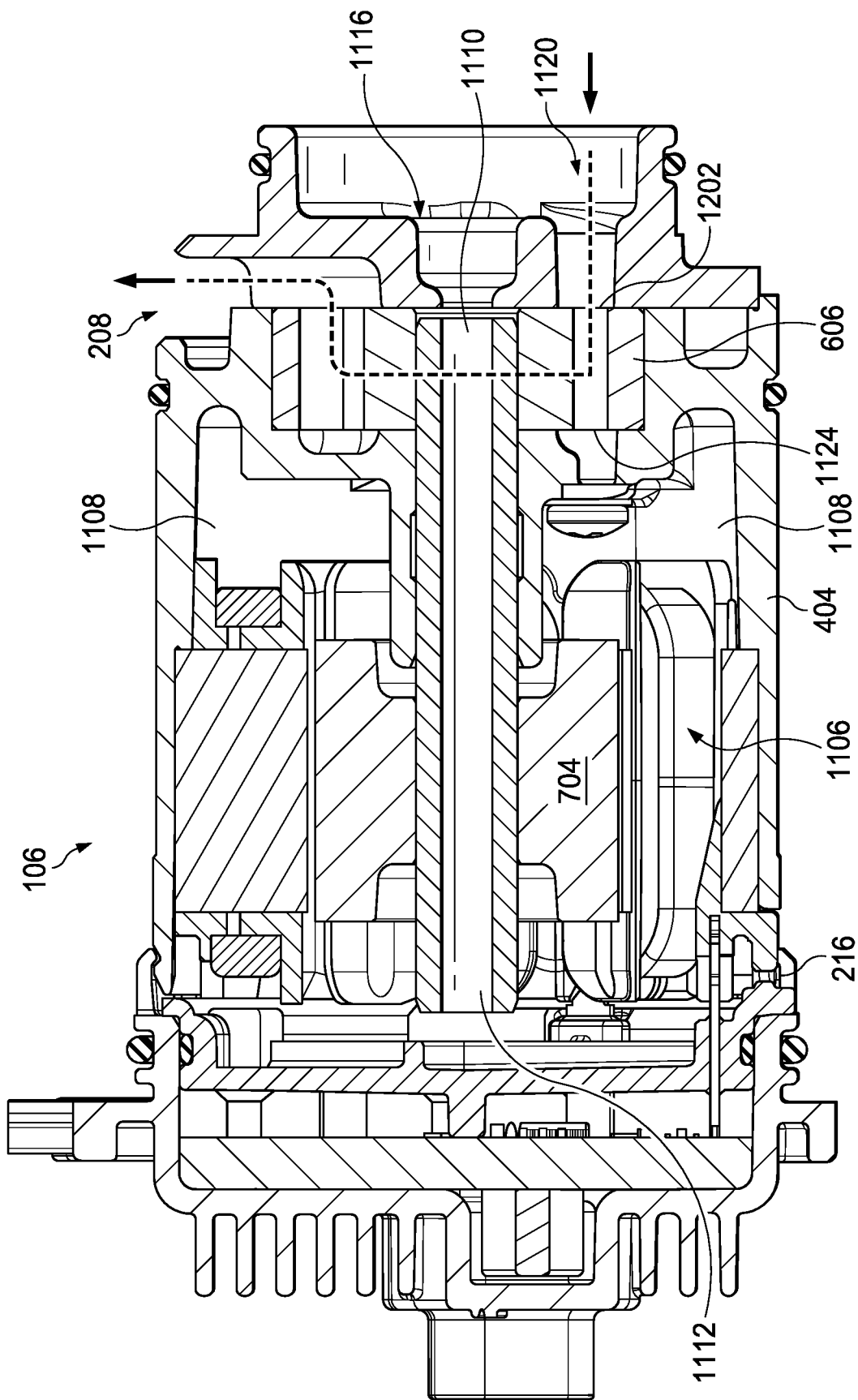
FIG. 12 illustrates a side sectional view of an electric pump system according to a disclosed embodiment, in particular showing a first fluid flow path.
Figure 13:
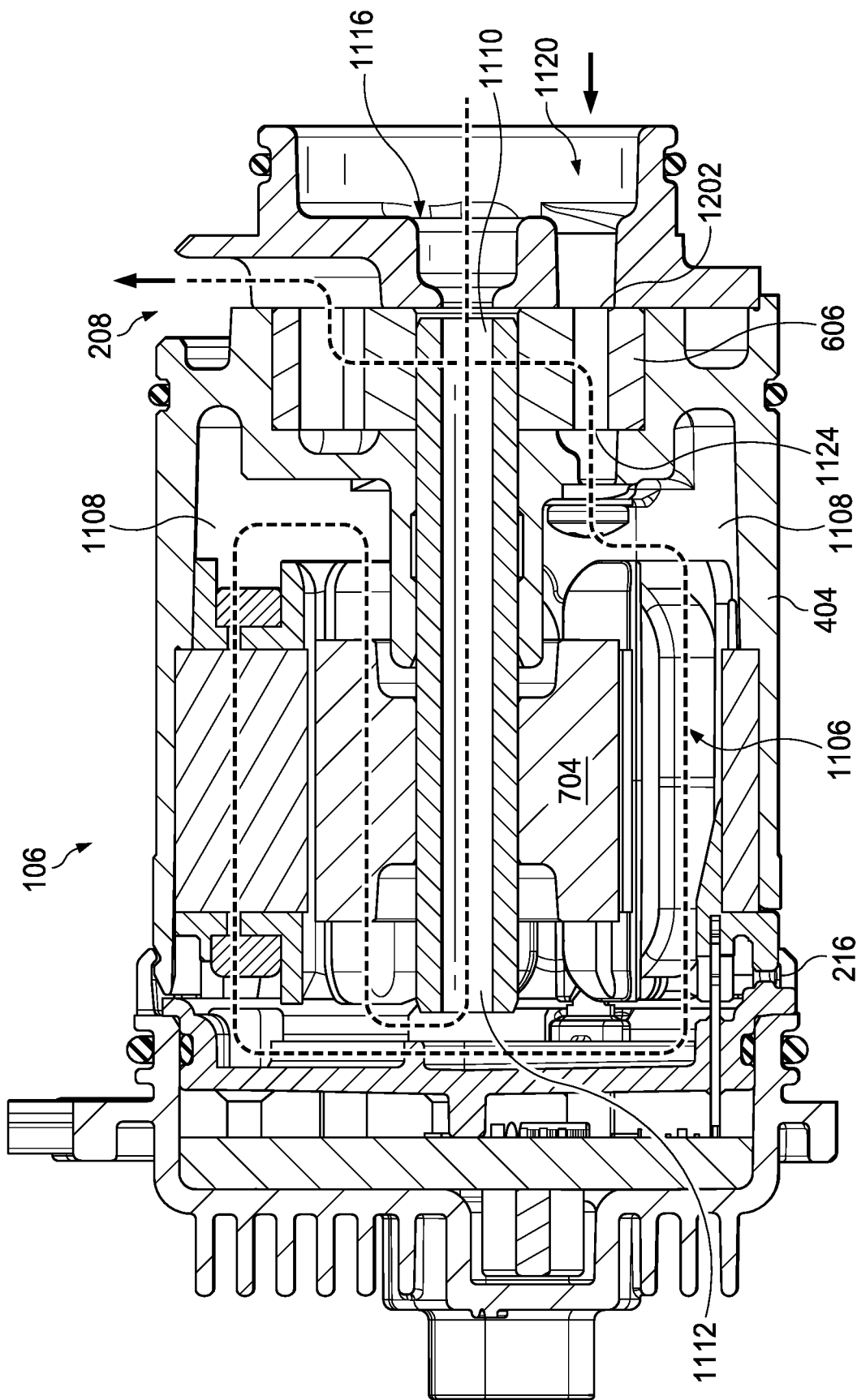
FIG. 13 illustrates a side sectional view of an electric pump system according to a disclosed embodiment, in particular showing a second fluid flow path.
Figure 14:
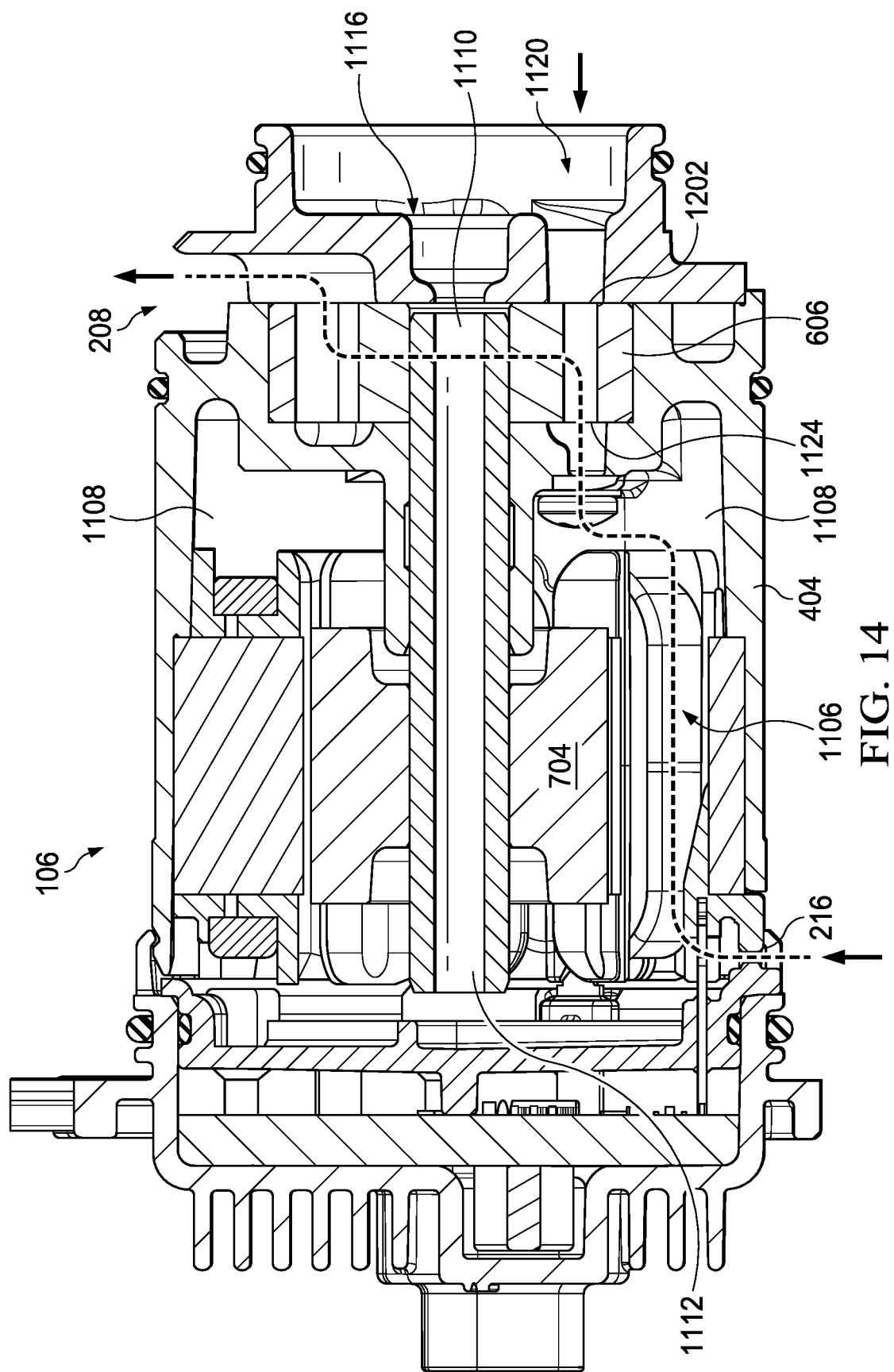
FIG. 14 illustrates a side sectional view of an electric pump system according to a disclosed embodiment, in particular showing a third fluid flow path.

FIGS. 12-14 illustrate a side sectional view of an electric pump system 106 according to a disclosed embodiment. FIG. 12 illustrates a side sectional view of electric pump system 106 according to a disclosed embodiment detailing a first oil flow path which makes use of the first fluid passageway. In particular, FIG. 12 illustrates a first oil flow path that includes oil entering electric pump system 106 via main pump inlet 1120, flowing through gerotor 600, and out of pump outlet 208.

FIG. 13 illustrates a side sectional view of electric pump system 106 according to a disclosed embodiment detailing an optional second oil flow path making use of second fluid passageway 1126 and third fluid passageway 1114. In particular, FIG. 13 illustrates a second oil flow path that where oil enters the electric pump system 106 via secondary pump inlet 1116, flows into shaft inlet 1110, out of shaft outlet 1112 into internal motor cavity 1108, past stator 1106 and rotor 704, and ultimately through motor housing 404 into pump inlet 1124, through gerotor 600 and out pump outlet 208.

FIG. 14 illustrates a side sectional view of electric pump system 106 according to a disclosed embodiment detailing an optional third oil flow path that makes use of second fluid passageway 1126. In particular, FIG. 14 illustrates a third oil flow path where oil enters electric pump system 106 via bypass inlet 216, flows past stator 1106 and rotor 704, through motor housing 404, into pump inlet 1124, through gerotor 600, and out pump outlet 208. As noted above with respect to FIG. 11, oil may also, optionally, be received through the circumferential gap between ECU 206 and motor housing 404 and follow a similar path to oil flowing into motor housing 404 via bypass inlet 216.

Figure 15:
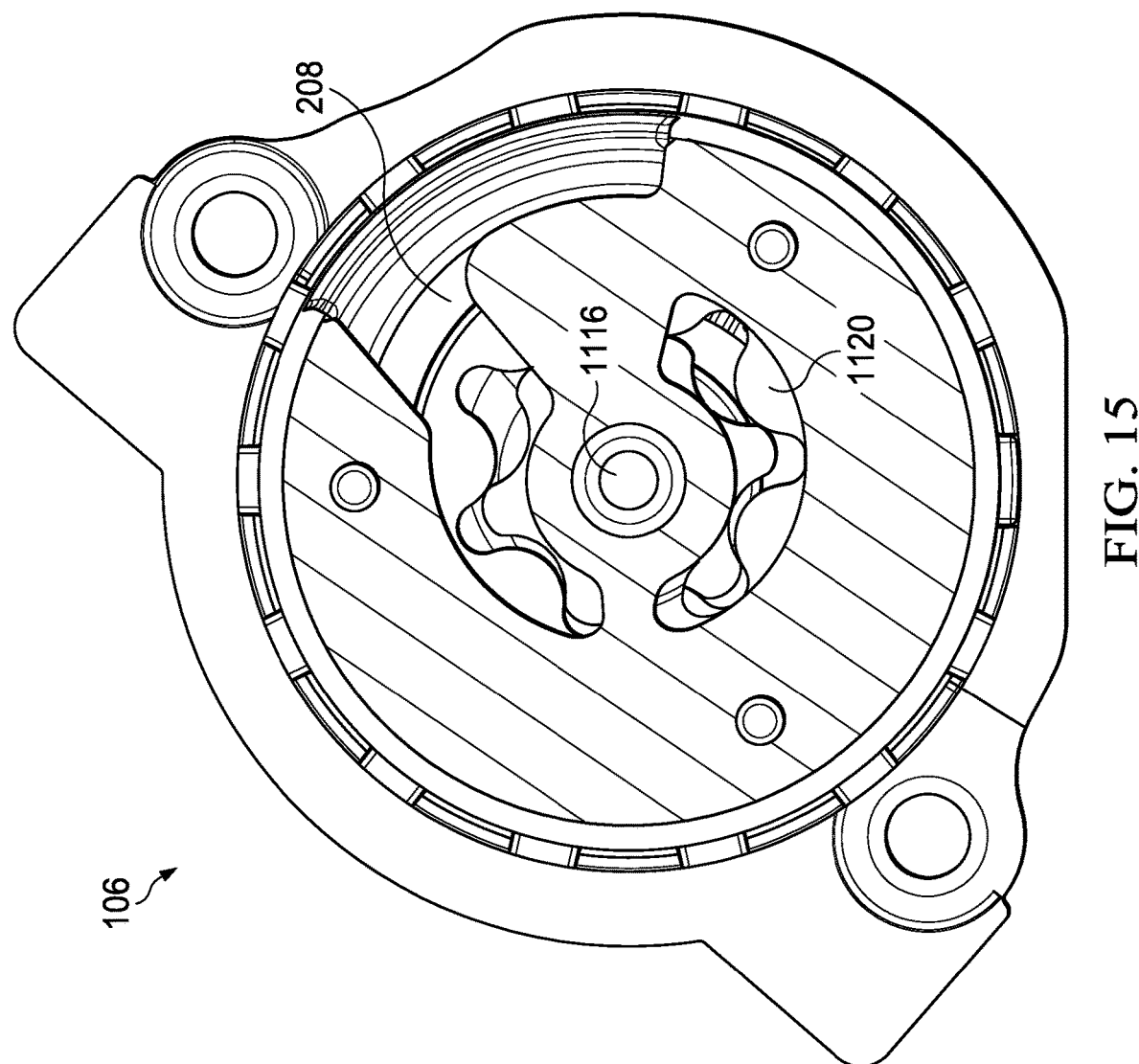
FIG. 15 illustrates an end sectional view of the electric pump system of FIGS. 11-14.

FIG. 15 illustrates a sectional end view of the electric pump system of FIGS. 11-14 showing electric pump system 106, secondary pump inlet 1116, main pump inlet 1120 and pump outlet 208.

Figure 16:
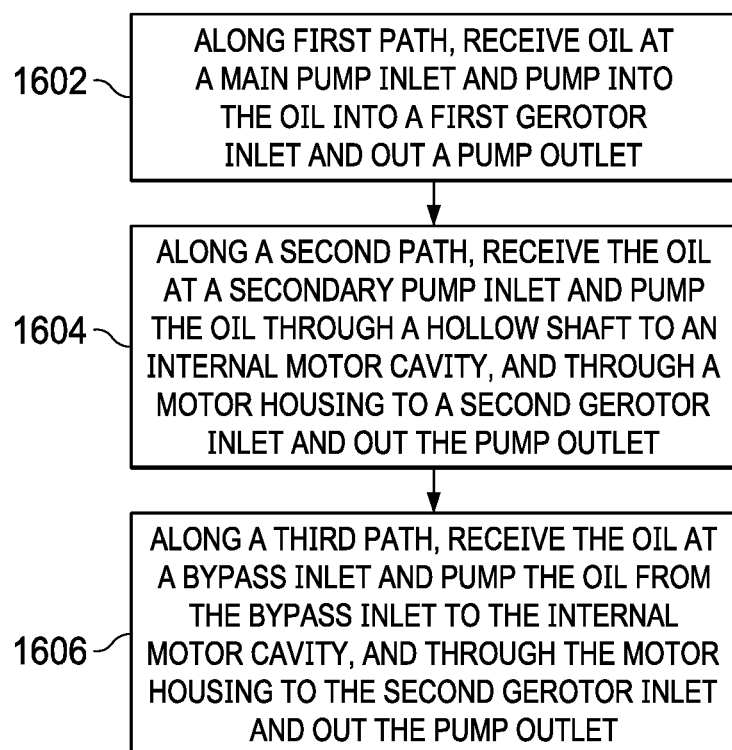
FIG. 16 is a flow diagram illustrating electric pump system operations according to a disclosed embodiment.

FIG. 16 is a flow diagram illustrating electric pump system operations according to a disclosed embodiment. With reference to FIGS. 11-14, FIG. 16 presents a method of pumping fluid through electric pump system according to a disclosed embodiment. According to the method, oil is pumped along three differing paths. Via the first path, the oil is received at a mechanical pump main inlet, and flows through a first gerotor inlet, and out a pump outlet (Step 1602). Optionally, the oil is received at a mechanical pump secondary inlet, and pumped, via a second path, through a hollow shaft from a shaft inlet to a shaft outlet, to an internal motor cavity, through a motor housing to a second gerotor inlet, and out the pump outlet (Step 1604). Optionally, the oil is received at a bypass inlet, and/or through a circumferential gap between an ECU and the motor housing, and optionally flows via a third path to the internal motor cavity, and through the motor housing to the second gerotor inlet, and out pump outlet (Step 1606).

A benefit of the system and method of the disclosed embodiments, is that very little heat is absorbed by the fluid from operation of electric pump system 106 when the fluid is exiting hollow shaft 706. By measuring at this point, ECU 206 can, therefore, get an accurate reading of the fluid prior to being substantially heated by electric pump system 106, but without having to use sensors positioned at or near the pump inlets which would necessitate communications channels for relaying information to ECU 206 thereby adding expense, complexity and additional points of failure. Information regarding the temperature of the fluid prior to being substantially heated by electric pump system 106 can be used for purposes of determining how much heat needs to be rejected from the fluid and what changes to make to the operation of the associated vehicle (e.g. reduce torque).

As will be appreciated by one of skill in the art, a slow rotating gear requires oil of a specific viscosity to stick to its surface. A gear of the same size with much higher rotational speed, e.g. at a reduction gear stage before the one above, may require a different temperature of oil in order to have it stick to the gear surface because the centrifugal forces are much higher. If the temperature is the same, because two separate oil temperatures are not available in the gearbox, one could use much more oil more orifices for the fast rotating gear.

According to embodiments described herein, the fluid temperature can be used to control and attempt to optimize the cooling and lubrication system of a vehicle so as to improve the efficiency of the associated electric drive unit. Specifically, the fluid temperature may be controlled to achieve certain lubrication properties. For example, hotter oil has lower viscosity which reduces drag and hydraulic power to pump the fluid, which can increase efficiency. If the oil becomes too hot, however, it will not provide sufficient cooling.

The fluid temperature reading feature of the oil pump can monitor the general health and performance of the fluid in the electric drive unit system. For example, if the oil is too hot, the oil pump may alert the car computer that something is wrong, for oil that is too hot can damage or/and reduce the life of some components on the drive unit.

Stated another way the temperature of fluid may be used to monitor the health and performance of the drive unit. The ECU may capture other information besides the temperature, such as pump speed, pump current composition, oil pressure, or other information. The information captured by the ECU may then be fed into a proprietary algorithm that monitors oil pump and overall drive unit health. The algorithm may provide an indication of service, such as when oil must be replaced or when the drive train needs to be serviced.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. An apparatus for pumping a fluid comprising:
   a motor including:
      a stator;
      a rotor comprising a hollow shaft; and
      a housing around the stator and rotor and defining an internal motor cavity;
   an electronic control unit connected to a first side of the motor, the electronic control unit comprising a microcontroller and a thermistor configured to measure a temperature of the fluid;
   wherein the electronic control unit is configured to determine a change to an operation of a vehicle associated with said apparatus;
   a mechanical pump comprising a first pump inlet, a second pump inlet, and a pump outlet, the mechanical pump connected to the motor through the second pump inlet;
   a first fluid passageway from the first pump inlet to the pump outlet;
   a second fluid passageway extending through the internal motor cavity to the pump outlet via the second pump inlet, wherein a fluid flow path extends through the second fluid passageway into the hollow shaft of the rotor from a shaft inlet to a shaft outlet into the internal motor cavity, past the stator and the rotor into a third fluid passageway that extends to the pump outlet, and wherein the thermistor is configured to measure the temperature of the fluid exiting the shaft outlet of the hollow shaft; and
   a bypass inlet proximate to the first side of the motor, the bypass inlet being in fluid communication with a portion of the fluid flow path that flows past the stator and the rotor and through the motor housing into the third fluid passageway.

2. The apparatus of claim 1, wherein at least a portion of the first fluid passageway and the second fluid passageway is common.

3. The apparatus of claim 1, wherein the mechanical pump is a gerotor.

4. The apparatus of claim 1, wherein the microcontroller controls the mechanical pump.

5. The apparatus of claim 1, wherein the change to the operation of the vehicle associated with said apparatus comprises a reduction of torque.

6. The apparatus of claim 1, wherein the electronic control unit includes cooling ribs.

7. The apparatus of claim 1, wherein the motor comprises a second side;
   the mechanical pump connected to the second side of the motor through the first pump inlet and connected to the second side of the motor through the second pump inlet.

8. The apparatus of claim 1, wherein the electronic control unit comprises a PCB and a second thermistor, wherein the second thermistor is configured to measure a temperature of the PCB.

9. The apparatus of claim 1, wherein the electronic control unit comprises a plurality of mounting legs.

10. A method of pumping a fluid in an electric pump system having a mechanical pump, a motor including a stator and a rotor comprising a hollow shaft, the motor having a first side and a pump side, and a motor housing defining an internal motor cavity, the method comprising:
    controlling the mechanical pump via an electric control unit connected to the first side of the motor;
    pumping fluid along a first fluid flow path through a first fluid passageway from a first pump inlet of the mechanical pump to a pump outlet of the mechanical pump;
    pumping fluid along a second fluid flow path through a second fluid passageway from the internal motor cavity to the pump outlet via a second pump inlet of the mechanical pump, wherein the fluid along the second fluid flow path flows through the hollow shaft of the rotor from a shaft inlet to a shaft outlet into the internal motor cavity, past the stator and the rotor and through the motor housing into a third fluid passageway that extends to the pump outlet;

pumping fluid into a bypass inlet which is in fluid communication with a portion of the second fluid flow path that flows past the stator and the rotor and through the motor housing into the third fluid passageway, the bypass inlet being proximate to the first side of the motor;

detecting, via a temperature sensor located adjacent to the shaft outlet, a temperature of the fluid exiting the hollow shaft; and determining a required amount of heat that needs to be rejected from the fluid via evaluation of a plurality of corrective actions responsive to the detected temperature of the fluid exiting the hollow shaft; wherein the plurality of corrective actions comprises rejecting heat by the electric pump system or a change to a motor parameter of a motor associated with a vehicle.

11. The method of claim 10, wherein the detected temperature of the fluid corresponds to a temperature of the fluid prior to the fluid entering the internal motor cavity.

12. The method of claim 10, wherein the detected temperature of the fluid corresponds to a temperature of the fluid prior to the fluid being heated by the electric pump system by a threshold amount.

13. The method of claim 10, wherein the change to the motor parameter of the motor associated with a vehicle comprises a reduction of torque.

14. An apparatus for pumping a fluid comprising:
a motor including:
a stator;
a rotor comprising a hollow shaft; and
a housing around the stator and rotor and defining an internal motor cavity;
an electronic control unit connected to a first side of the motor, the electronic control unit comprising a microcontroller and a thermistor configured to measure a temperature of the fluid;
wherein the electronic control unit is configured to determine a change to an operation of a vehicle associated with said apparatus;
a mechanical pump comprising a first pump inlet, a second pump inlet, and a pump outlet, the mechanical pump connected to the motor through the first pump inlet and connected to the motor through a second pump inlet;
a first fluid passageway from the first pump inlet to the pump outlet;
a second fluid passageway extending through the internal motor cavity to the pump outlet via the second pump inlet, wherein a fluid flow path extends through the second fluid passageway into the hollow shaft of the rotor from a shaft inlet to a shaft outlet into the internal motor cavity, past the stator and the rotor into a third fluid passageway that extends to the pump outlet, and wherein the thermistor is configured to measure the temperature of the fluid exiting the shaft outlet of the hollow shaft; and
a bypass inlet proximate to the first side of the motor, the bypass inlet being in fluid communication with a portion of the fluid flow path that flows past the stator and the rotor and through the motor housing into the third fluid passageway.

15. The apparatus of claim 14, wherein at least a portion of the first fluid passageway and the second fluid passageway is common.

16. The apparatus of claim 14, wherein the microcontroller controls the mechanical pump.

17. The apparatus of claim 14, wherein the change to the operation of the vehicle associated with said apparatus comprises a reduction of torque.

* * * * *